US012255934B2

(12) United States Patent
Schemers et al.

(10) Patent No.: US 12,255,934 B2
(45) Date of Patent: *Mar. 18, 2025

(54) SEAMLESS COMMUNICATION RESOURCE TRANSITION BETWEEN A GROUP-BASED COMMUNICATION SYSTEM AND AN EXTERNAL COMMUNICATION SYSTEM

(71) Applicant: Salesforce, Inc., San Francisco, CA (US)

(72) Inventors: Roland Schemers, Woodside, CA (US); James McPhail, San Francisco, CA (US); Matthew Wahl, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/215,587

(22) Filed: Jun. 28, 2023

(65) Prior Publication Data
US 2023/0344879 A1 Oct. 26, 2023

Related U.S. Application Data

(63) Continuation of application No. 17/942,595, filed on Sep. 12, 2022, now Pat. No. 11,729,226, which is a continuation of application No. 17/020,049, filed on Sep. 14, 2020, now Pat. No. 11,470,126, which is a
(Continued)

(51) Int. Cl.
*H04L 65/1069* (2022.01)
*H04L 9/40* (2022.01)
*H04L 65/1083* (2022.01)
*H04L 65/1096* (2022.01)

(52) U.S. Cl.
CPC ......... *H04L 65/1086* (2013.01); *H04L 63/08* (2013.01); *H04L 65/1069* (2013.01); *H04L 65/1096* (2013.01)

(58) Field of Classification Search
None
See application file for complete search history.

(56) References Cited

U.S. PATENT DOCUMENTS

| 6,073,133 A * | 6/2000 | Chrabaszcz ......... G06Q 10/107 709/200 |
| 9,053,580 B2 | 6/2015 | Adam et al. |
| 9,633,399 B2 | 4/2017 | George et al. |

(Continued)

OTHER PUBLICATIONS

Hu, et al., "Attribute Considerations for Access Control Systems", NIST Special Publication 800-205, US Department of Commerce, Jun. 2019, pp. 1-42.
(Continued)

*Primary Examiner* — Joshua Joo
(74) *Attorney, Agent, or Firm* — Lee & Hayes, P.C.

(57) ABSTRACT

Method, apparatus and computer program product for seamless communication resource transition are described herein. A user may wish to share an external communication resource within a group-based communication system. Settings may be provided allowing the user to more effectively share the external communication resource. The user may select the appropriate settings such that the external communication resource can be transmitted to the group-based communication system for display in accordance with the selected settings.

20 Claims, 15 Drawing Sheets

Related U.S. Application Data continuation of application No. 16/264,100, filed on Jan. 31, 2019, now Pat. No. 10,805,362.

(56) References Cited

U.S. PATENT DOCUMENTS

| | | | |
|---|---|---|---|
| 2005/0114711 A1 | 5/2005 | Hesselink et al. | |
| 2005/0228864 A1* | 10/2005 | Robertson | H04L 51/48 709/217 |
| 2009/0327853 A1 | 12/2009 | Dean et al. | |
| 2012/0151060 A1* | 6/2012 | Dawson | H04L 51/04 709/225 |
| 2012/0206423 A1 | 8/2012 | Wong et al. | |
| 2012/0278404 A1 | 11/2012 | Meisels et al. | |
| 2014/0289868 A1* | 9/2014 | Byrne | H04L 63/083 726/28 |
| 2015/0012808 A1* | 1/2015 | Ernest | G06F 16/13 715/205 |
| 2015/0249717 A1* | 9/2015 | Mencke | G06F 16/51 709/204 |
| 2015/0278763 A1* | 10/2015 | Patil | G06F 16/285 705/301 |
| 2015/0347010 A1 | 12/2015 | Yang et al. | |
| 2015/0350296 A1 | 12/2015 | Yang et al. | |
| 2015/0350297 A1 | 12/2015 | Yang et al. | |
| 2015/0358259 A1* | 12/2015 | Sterns | H04L 51/066 709/206 |
| 2016/0085983 A1* | 3/2016 | Keohane | H04L 63/0428 726/28 |
| 2016/0117520 A1 | 4/2016 | Safa | |
| 2016/0196031 A1 | 7/2016 | Bovet et al. | |
| 2016/0261680 A1 | 9/2016 | Hesselink et al. | |
| 2017/0068904 A1* | 3/2017 | Korycki | G06N 20/00 |
| 2017/0180298 A1* | 6/2017 | Arbajian | H04L 51/42 |
| 2017/0192730 A1 | 7/2017 | Yang et al. | |
| 2017/0364897 A1 | 12/2017 | Sarkar et al. | |
| 2018/0034750 A1* | 2/2018 | Wang | H04L 12/18 |
| 2018/0052587 A1 | 2/2018 | LaPier et al. | |
| 2018/0083976 A1* | 3/2018 | Egan | H04L 63/104 |
| 2018/0287982 A1 | 10/2018 | Draeger et al. | |
| 2019/0090014 A1 | 3/2019 | Shoop | |
| 2019/0220438 A1* | 7/2019 | Pal | G06F 9/453 |
| 2020/0042736 A1 | 2/2020 | Ciancio-Bunch et al. | |
| 2020/0412771 A1 | 12/2020 | Schemers et al. | |
| 2021/0200719 A1 | 7/2021 | Yang et al. | |
| 2021/0224261 A1* | 7/2021 | Beausoleil | H04L 63/08 |
| 2021/0306812 A1 | 9/2021 | Gross et al. | |
| 2021/0312010 A1 | 10/2021 | Murphy et al. | |
| 2022/0012353 A1 | 1/2022 | Ow | |
| 2023/0012993 A1 | 1/2023 | Schemers et al. | |

OTHER PUBLICATIONS

Matsumoto, T. et al., "Chocoa Communicator—A New Communication System Based on Awareness and Text Communications", Fujitsu Sci. Tech. J., 36, 2, (Dec. 2000), pp. 154-161.
Office Action for U.S. Appl. No. 17/942,595, mailed on Jan. 19, 2023, Roland Schemers, "Seamless Communication Resource Transition Between a Group-Based Communication System and an External Communication System," 9 pages.
Office Action for U.S. Appl. No. 16/264,100, mailed on Feb. 20, 2020, Roland Schemers, "Seamless Communication Resource Transition Between Communication Systems," 5 page.
Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.
Ernie Smith, "Picking Up The Slack", Tedium, [online][retrieved May 9, 2019]. Retrieved from the Internet: <URL: https://tedium.co/2017/10/17/irc-vs-slack-chat-history/>. (dated Oct. 17, 2017) 13 pages.
David Auberbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM).
Michael Carney, "Slack is thriving on a cocktail of whimsy and great timing", Pandodaily, LexisNexis, https://advance.lexis.com/api/permalink/dd2d4ee5-2ddf-4d3a-a1d9-3bcee5e38b74/?context=1000516, (dated Feb. 6, 2015, 2:12 AM) 4 pages.
"Die, Email, Die! A Flickr Cofounder Aims To Cut Us All Some Slack", Readwriteweb, LexisNexis, https://advance.lexis.com/api/permalink/33dd79e2-90f5-409d-ae27-5a2c7e86bf31/?context=1000516>. (dated Aug. 14, 2013, 4:15 PM) 3 pages.
Robert Hof, "Stewart Butterfield On How Slack Became A $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;26 PM), 4 pages.
"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (Nov. 2018) 16 pages.
Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 3 pages.
Internet Relay Chat, Wikipedia, [online][retrieved May 30, 2019]. Retrieved from the Internet: <URL: https://en.wikipedia.org/wiki/Internet_Relay_Chat>. (dated May 28, 2019) 21 pages.
Mike Issac, "Slack, a Start-Up With an App to Foster Business Collaboration, Is Valued at $1.1 Billion", The New York Times Blogs (Bits), LexisNexis, https://advance.lexis.com/api/permalink/3eb84b34-a8f9-4d7d-9573-89d9598a4963/?context=1000516>. (dated Oct. 31, 2014) 3 pages.
Adrienne LaFrance, "The Triumph of Email", Atlantic Online, LexisNexis, https://advance.lexis.com/api/permalink/32d7ddd9-d4c1-4a73-86f7-08ab5842fde6/?context=1000516, (dated Jan. 6, 2016) 6 pages.
Office Action for U.S. Appl. No. 17/020,049, mailed on Jan. 20, 2022, Roland Schemers, "Seamless Communication Resource Transition Between a Group-Based Communication System and an External Communication System," 14 pages.
The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.
Jonathan Vanian, "Why these startups think chat apps are the next big thing in workplace collaboration", GIGAOM, LexisNexis, https://advance.lexis.com/api/permalink/e83778c8-09c8-43aa-9ba0-88526283de69/?context=1000516, (dated Aug. 1, 2014, 5:45 PM) 5 pages.
Rebecca Walberg, "Email biggest office waste of time: survey", National Post, At FP10, LexisNexis, https://advance.lexis.com/api/permalink/96268e3f-26ad-48ac-a98f-6c39804ebded/?context=1000516, (dated Mar. 4, 2014) 3 pages.

* cited by examiner

SEAMLESS COMMUNICATION RESOURCE TRANSITION BETWEEN A GROUP-BASED COMMUNICATION SYSTEM AND AN EXTERNAL COMMUNICATION SYSTEM

RELATED APPLICATIONS

This patent application is a continuation application claiming priority benefit, with regard to all common subject matter, of U.S. patent application Ser. No. 17/942,595, filed Sep. 12, 2022, and entitled "SEAMLESS COMMUNICATION RESOURCE TRANSITION BETWEEN A GROUP-BASED COMMUNICATION SYSTEM AND AN EXTERNAL COMMUNICATION SYSTEM" ("the '595 Application"). The '595 Application is a continuation application claiming priority benefit, with regard to all common subject matter, of U.S. patent application Ser. No. 17/020,049, filed Sep. 14, 2020, and entitled "SEAMLESS COMMUNICATION RESOURCE TRANSITION BETWEEN A GROUP-BASED COMMUNICATION SYSTEM AND AN EXTERNAL COMMUNICATION SYSTEM," now U.S. Pat. No. 11,470,126, issued Oct. 11, 2022 ("the '049 Application"). The '049 Application is a continuation application claiming priority benefit, with regard to all common subject matter, of U.S. patent application Ser. No. 16/264,100, filed Jan. 31, 2019, and entitled "SEAMLESS COMMUNICATION RESOURCE TRANSITION BETWEEN COMMUNICATION SYSTEMS," now U.S. Pat. No. 10,805,362, issued Oct. 13, 2020. The identified earlier-filed patent applications are hereby incorporated by reference in their entirety into the present application.

BACKGROUND

Applicant has identified many deficiencies and problems associated with existing methods, apparatus, and systems related to communication transitions between communication systems. Through applied effort, ingenuity, and innovation, many of these identified deficiencies and problems have been solved by developing solutions that are in accordance with embodiments of the present disclosure, many examples of which are described in detail herein.

BRIEF SUMMARY

In general, embodiments of the present disclosure provide methods, apparatus, systems, computing devices, and/or the like seamless communication resource transition between communication systems by using recommended transitional profiles, retrospective recipient predictions, prospective recipient predictions, and/or client-side transition agents.

In accordance with one aspect, an apparatus is provided. The apparatus comprises at least one processor and at least one non-transitory memory comprising program code. The at least one non-transitory memory and the program code are configured to, with the at least one processor, cause the apparatus to perform a method of providing a seamless communication resource transition between a group-based communication system and an external communication system, the group-based communication system being associated with a plurality of group-based user accounts and having one or more group-based communication interfaces.

In embodiments, the method comprises receiving, from a first computing device, an interface display indication representative of a first user interface being rendered for display on the first computing device. In embodiments, the first user interface provides an external communication resource visual representation associated with an external communication resource of the external communication system. In embodiments, the method comprises receiving, from the first computing device, a seamless transition request for providing the seamless communication resource transaction. In embodiments, the method comprises, in response to receiving the seamless transition request, transmitting to the first computing device a second user interface rendered for display by the first computing device in conjunction with the first user interface such that the second user interface depicts a recommended transitional profile visual representation associated with a recommended transitional profile. In embodiments, the recommended transitional profile is determined by a transitional profile recommendation routine.

In embodiments, the transitional profile recommendation routine is configured to perform steps comprising identifying one or more external parameter values associated with the external communication resource and identifying one or more group-based parameters for the external communication resource. In embodiments, each group-based parameter of the one or more group-based parameters defines a respective variable property of a group-based communication resource associated with the external communication resource, the one or more group-based parameters comprising an interface identification parameter that defines one or more first group-based communication interfaces of the one or more group-based communication interfaces with which the group-based communication resource is associated.

In embodiments, the transitional profile recommendation routine is configured to determine, based on the one or more external parameter values for the external communication resource, the recommended transitional profile for the external communication resource. In embodiments, the recommended transitional profile comprises one or more group-based recommended values for the external communication resource, each group-based recommended value of the one or more group-based recommended values defining a respective recommended value for a respective variable property of the group-based communication resource, and the one or more group-based recommended values comprise an interface identifier recommended value that defines the respective recommended value for the interface identification variable property to include the one or more first group-based communication interfaces.

In embodiments, determining the interface identifier recommended value comprises: determining, based on a first external parameter values subset comprising a subset of the one or more external parameter values, a retrospective recipient prediction for the external communication resource, wherein the retrospective recipient prediction defines one or more first group-based user accounts of the plurality of group-based user accounts with significant past interaction association with external communication resources having a plurality of external parameter values in common with all of the external parameter values of the first subset of the one or more external parameter values.

In embodiments, determining the interface identifier recommended value further comprises: determining, based on a second external parameter values subset, a prospective recipient prediction for the external communication resource, wherein the prospective recipient prediction defines one or more second group-based user accounts of the plurality of group-based user accounts estimated to have significant future interest prediction in an inferred subject matter designation of the external communication resource.

In embodiments, determining the interface identifier recommended value further comprises determining, based on the retrospective recipient prediction and the prospective recipient prediction, the interface identifier recommended value for the external communication resource.

In embodiments, the method comprises receiving, from the first computing device, an authorization input associated with the recommended transitional profile visual representation, wherein the authorization input is generated based on user interaction with the second user interface.

In embodiments, the method comprises generating the seamless transition based on the authorization input, wherein generating the seamless transition comprises transmitting one or more seamless transition instructions to the group-based communication system.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure. It will be appreciated that the scope of the disclosure encompasses many potential embodiments in addition to those here summarized, some of which will be further described below.

BRIEF DESCRIPTION OF THE DRAWINGS

Figure 1:
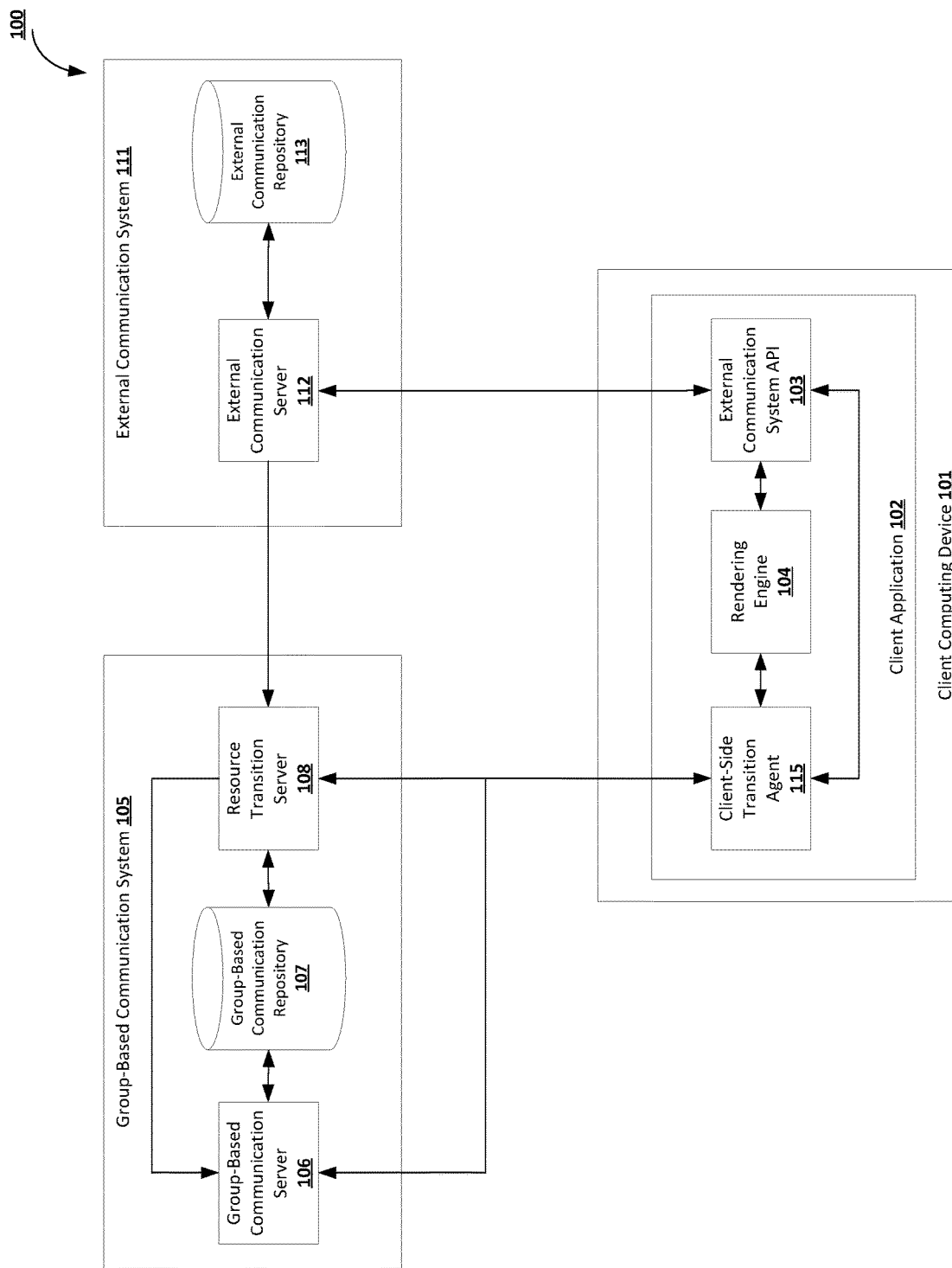

Having thus described some embodiments in general terms, references will now be made to the accompanying drawings, which are not necessarily drawn to scale, and wherein:

FIG. 1 is an example system architecture within which embodiments of the present disclosure may operate.

Figure 2:
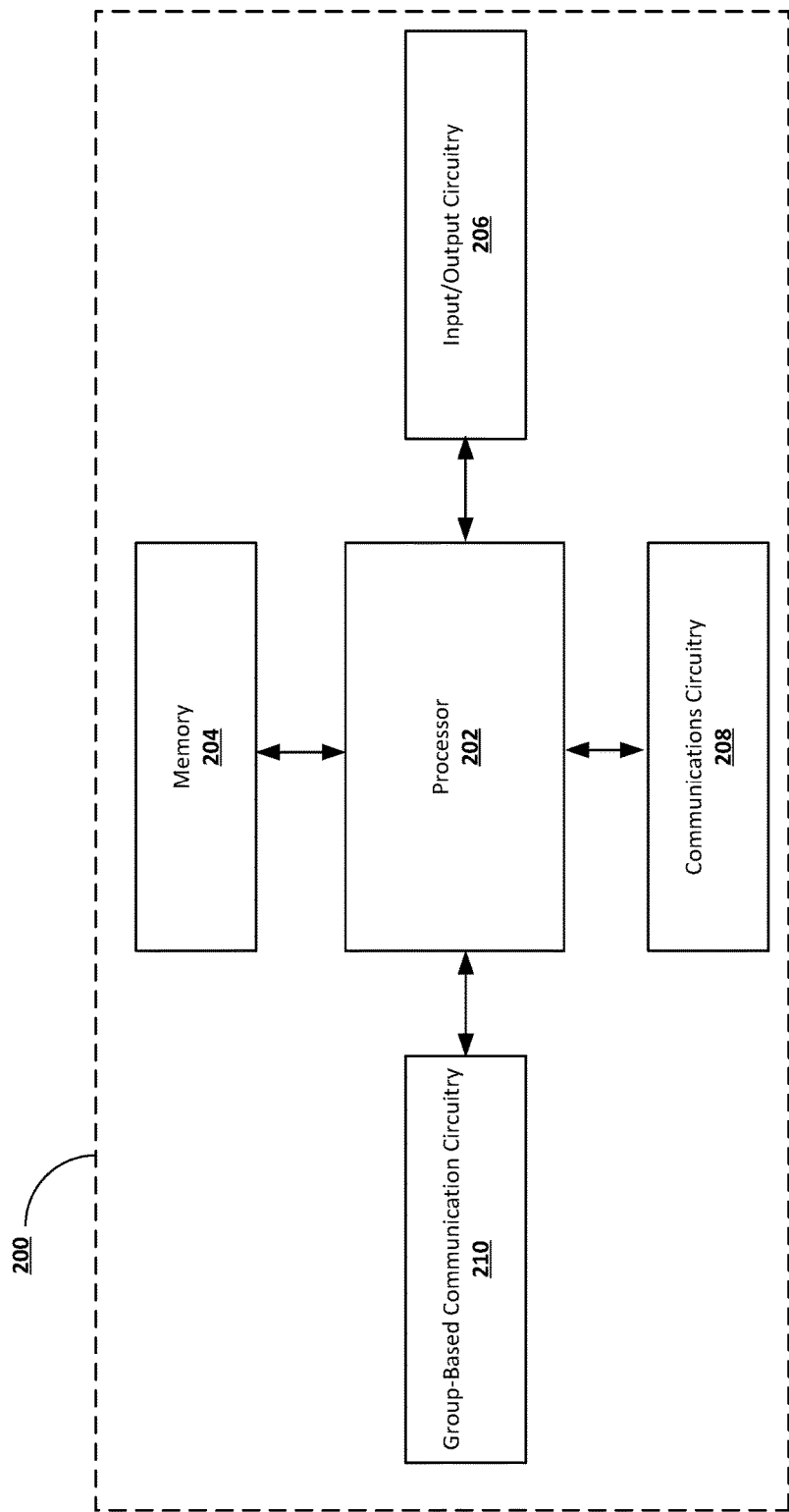

FIG. 2 is a schematic diagram of an example apparatus for a group-based communication server in accordance with one embodiment of the present disclosure.

Figure 3:
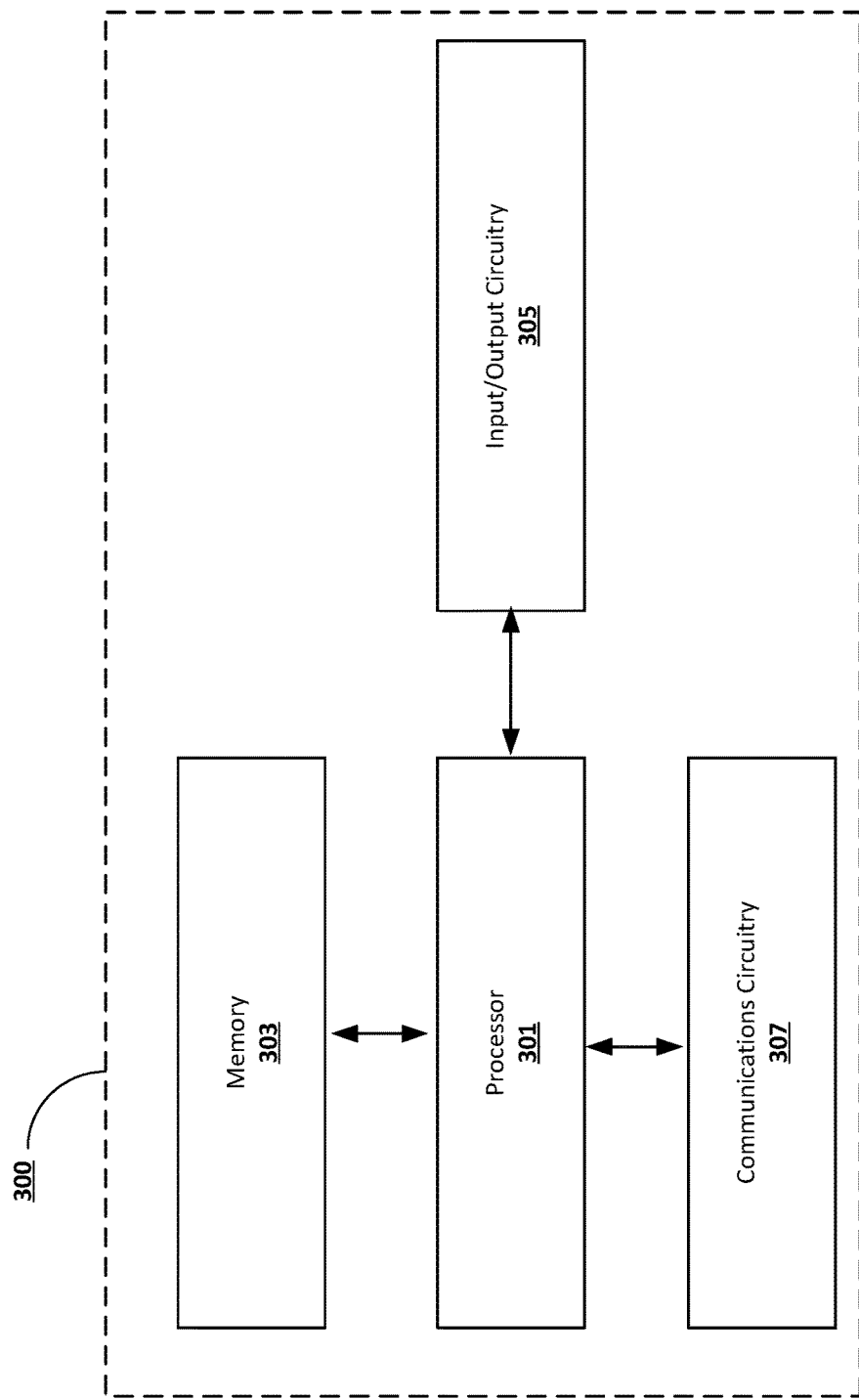

FIG. 3 is a schematic diagram of an example apparatus for a client device in accordance with one embodiment of the present disclosure.

Figure 4:
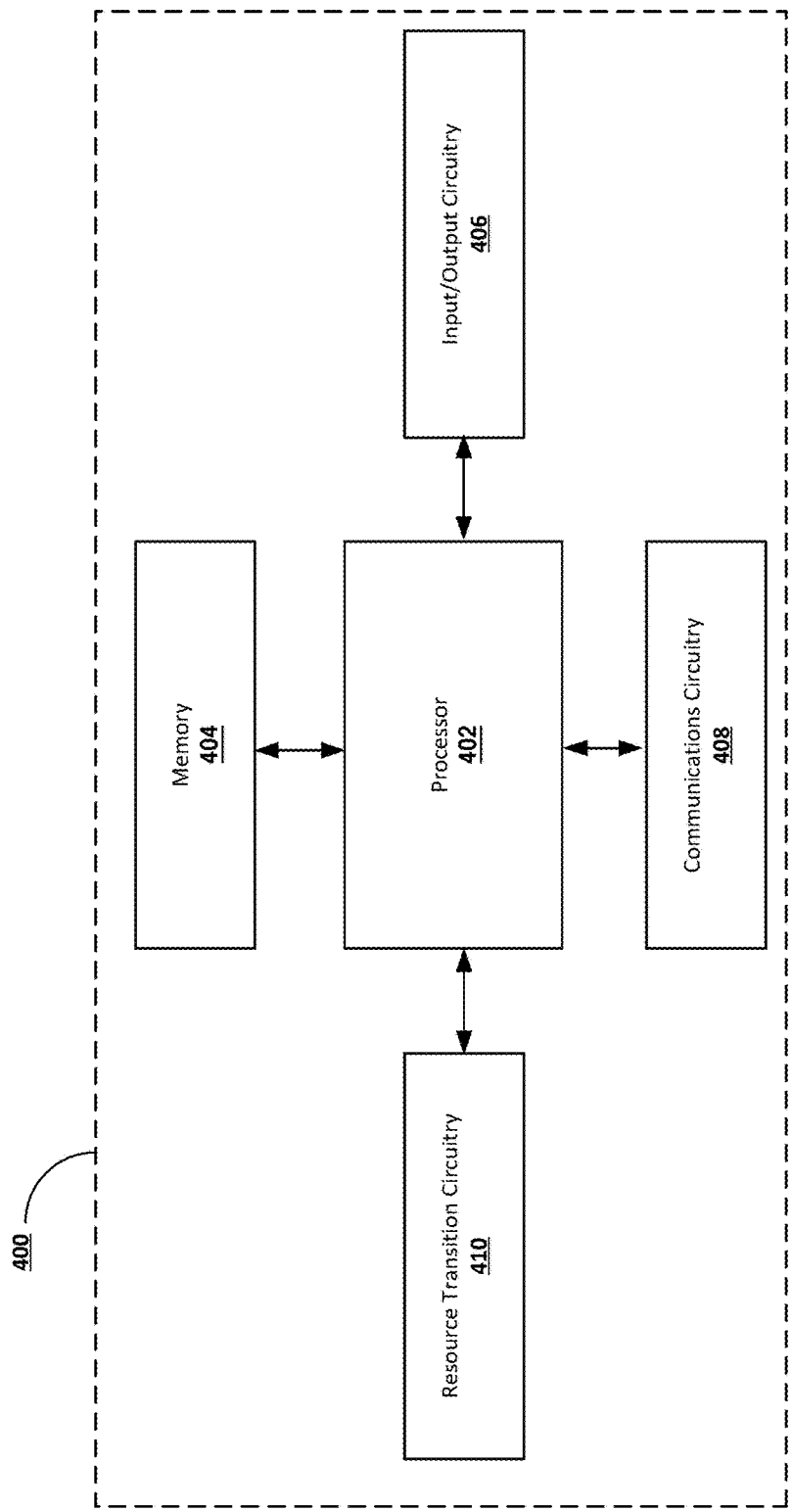

FIG. 4 is a schematic diagram of an example diagram for an example resource transition server in accordance with one embodiment of the present disclosure.

Figure 5:
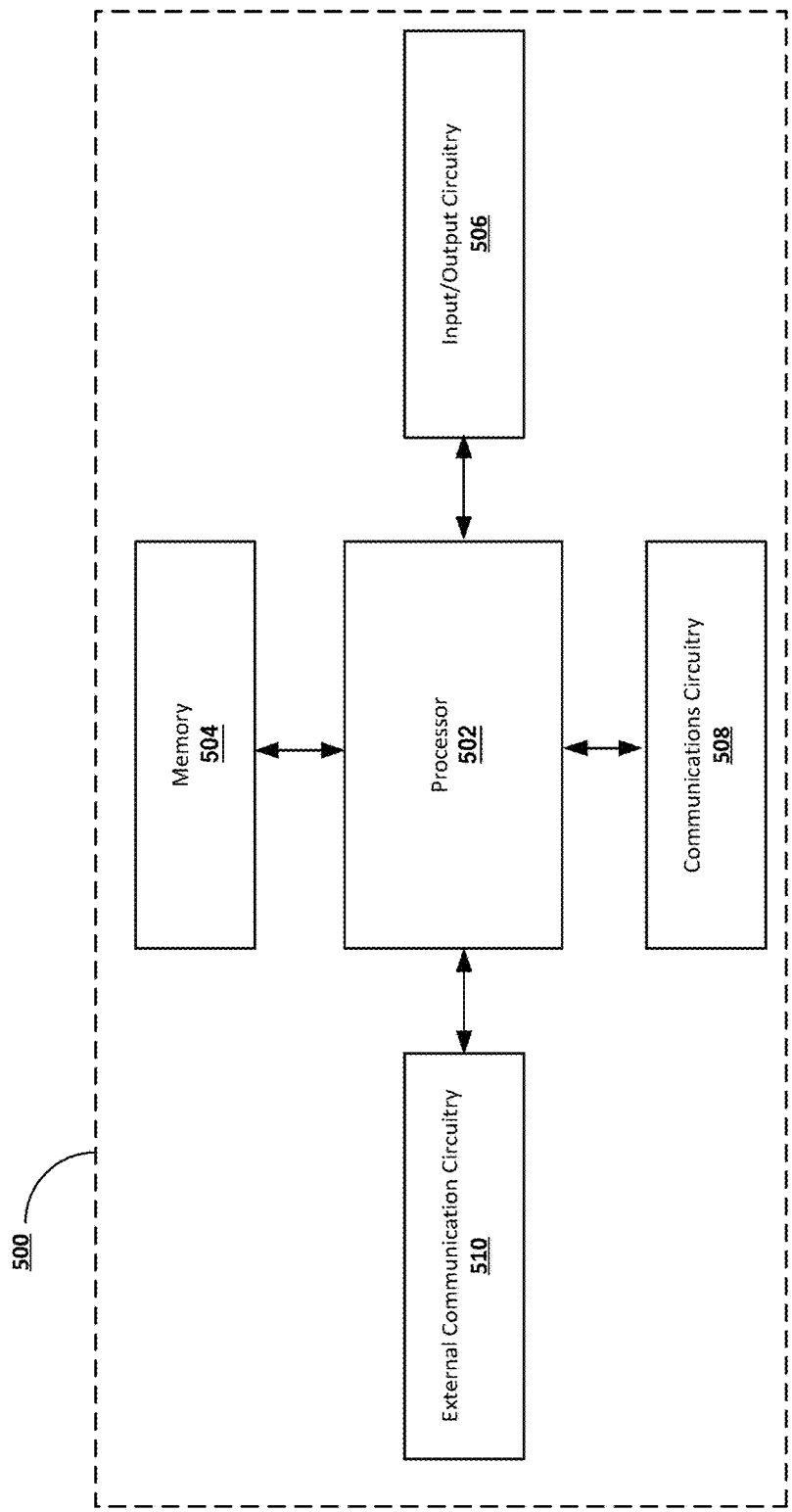

FIG. 5 is a schematic diagram of an example diagram for an example external communication server in accordance with one embodiment of the present disclosure.

Figure 6:
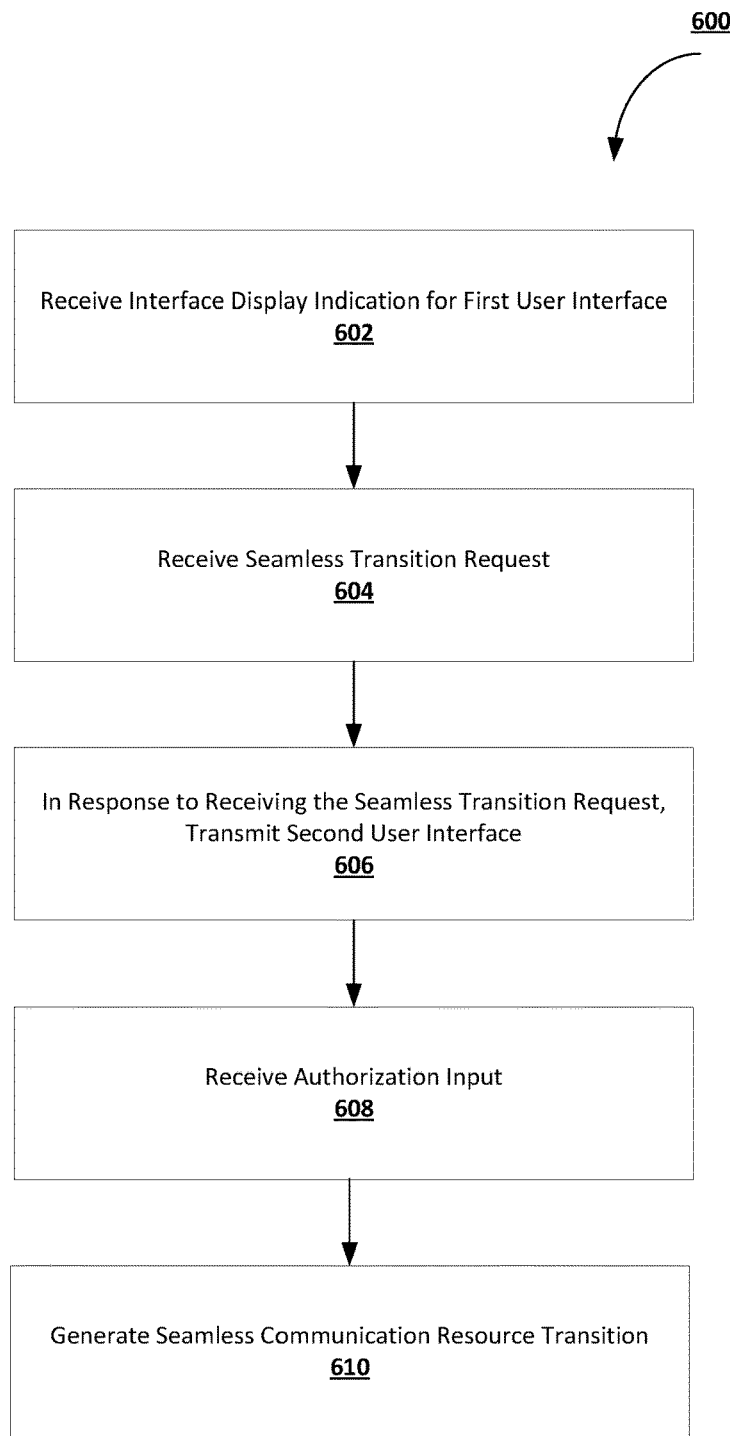

FIG. 6 is a flow diagram of an example process for performing seamless communication resource transition in accordance with one embodiment of the present disclosure.

Figure 7A:
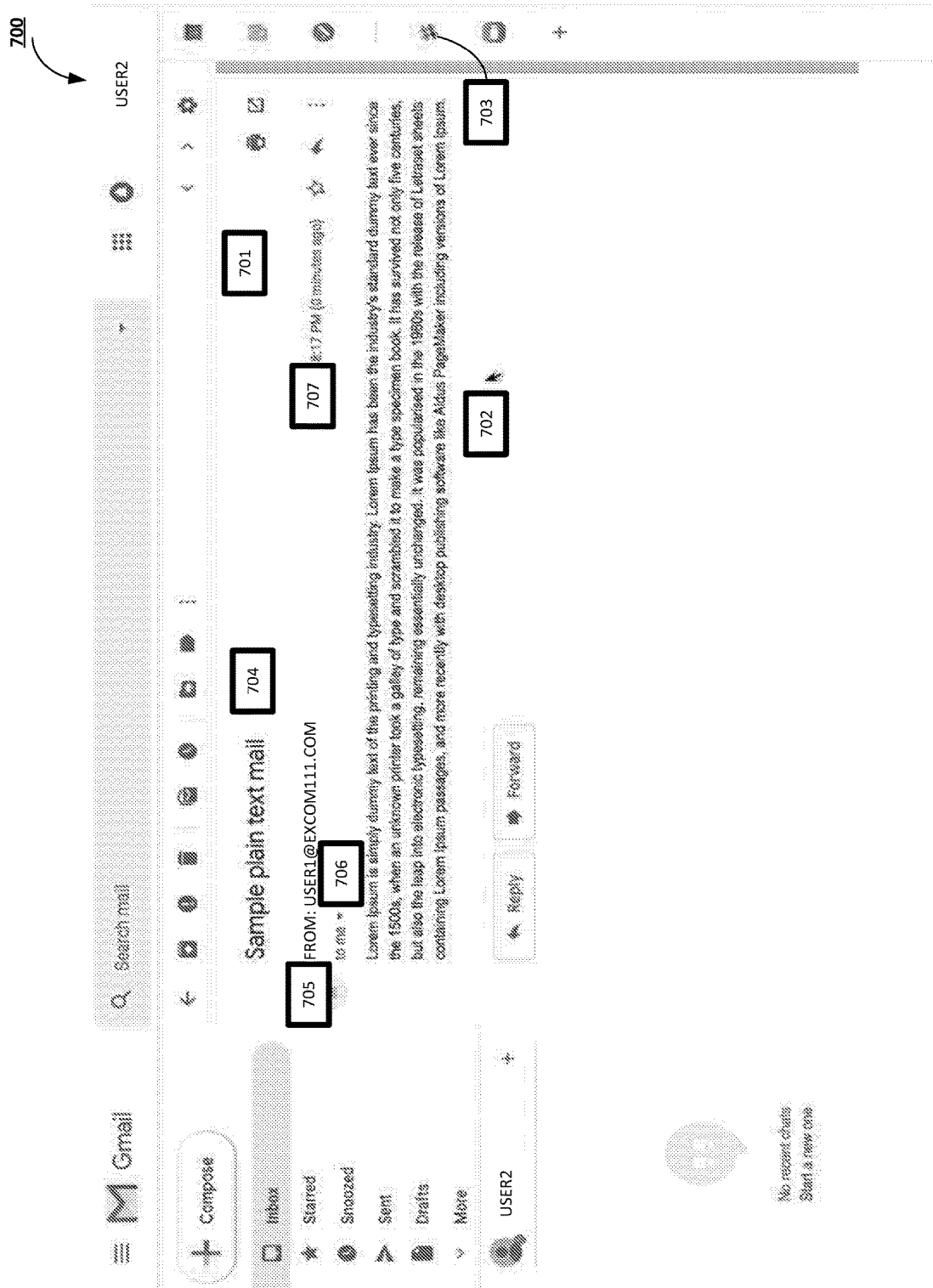

FIG. 7A provides an operational example of an external communication resource user interface in accordance with one embodiment of the present disclosure.

Figure 7B:
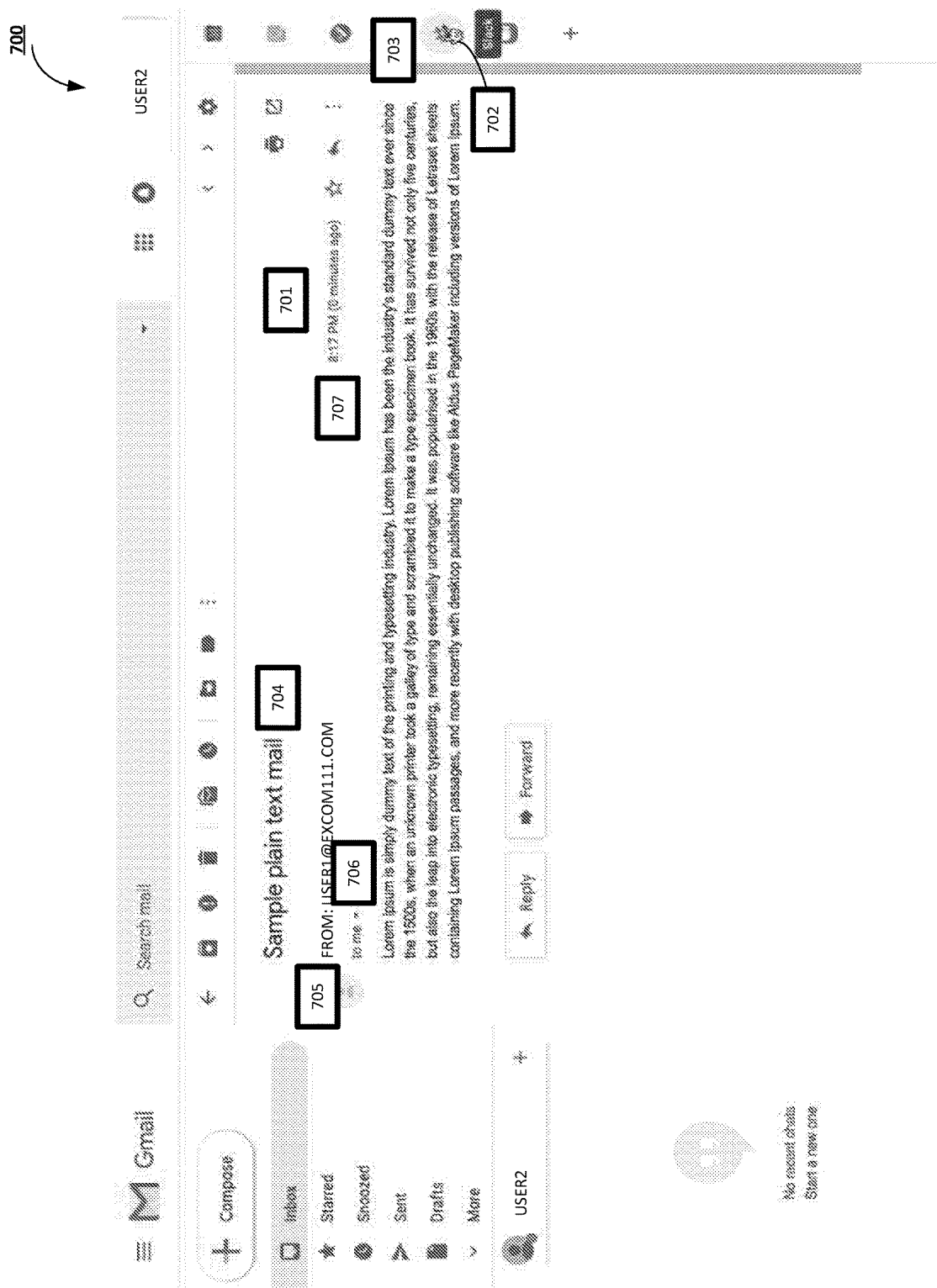

FIG. 7B provides an operational example of an external communication resource user interface in accordance with one embodiment of the present disclosure.

Figure 8:
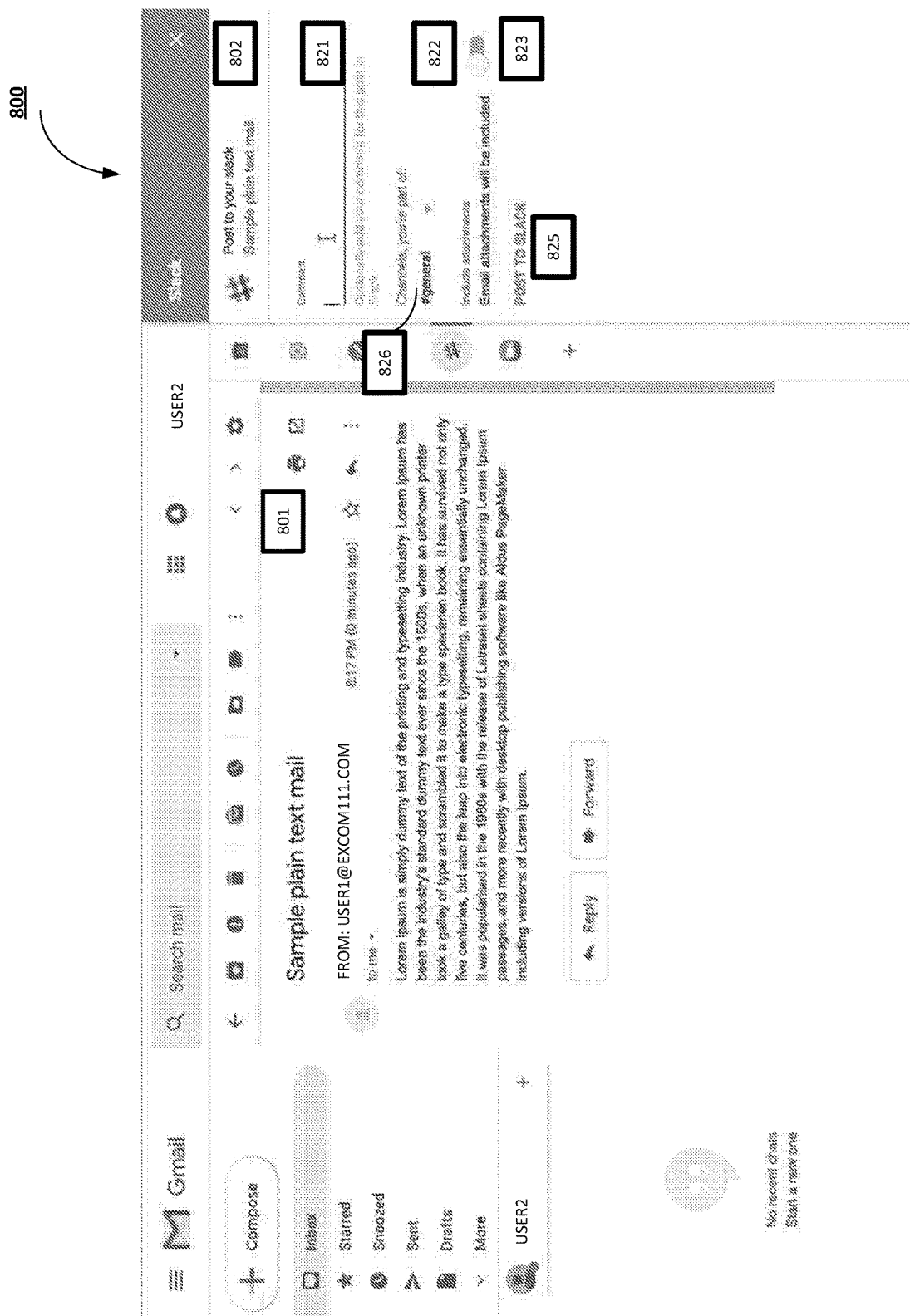

FIG. 8 provides an operational example of recommendation profile user interfaces in accordance with one embodiment of the present disclosure.

Figure 9:
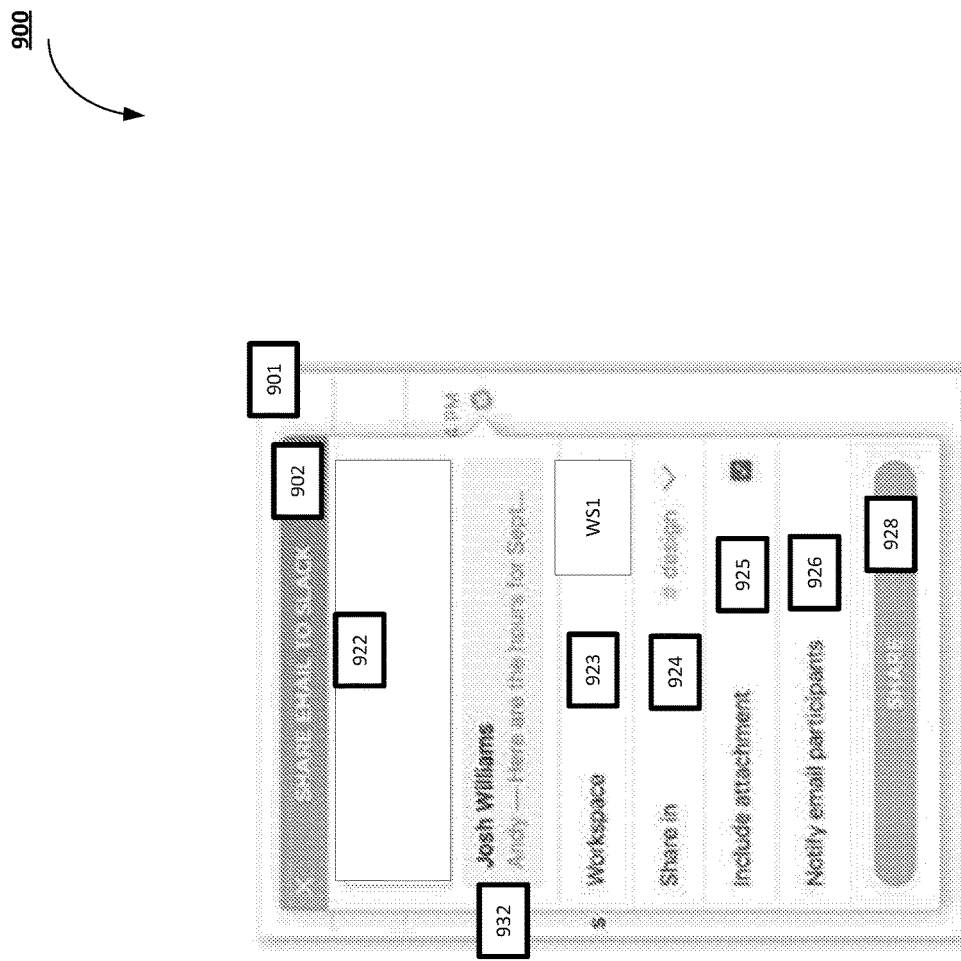

FIG. 9 provides an operational example of recommendation profile user interfaces in accordance with one embodiment of the present disclosure.

Figure 10:
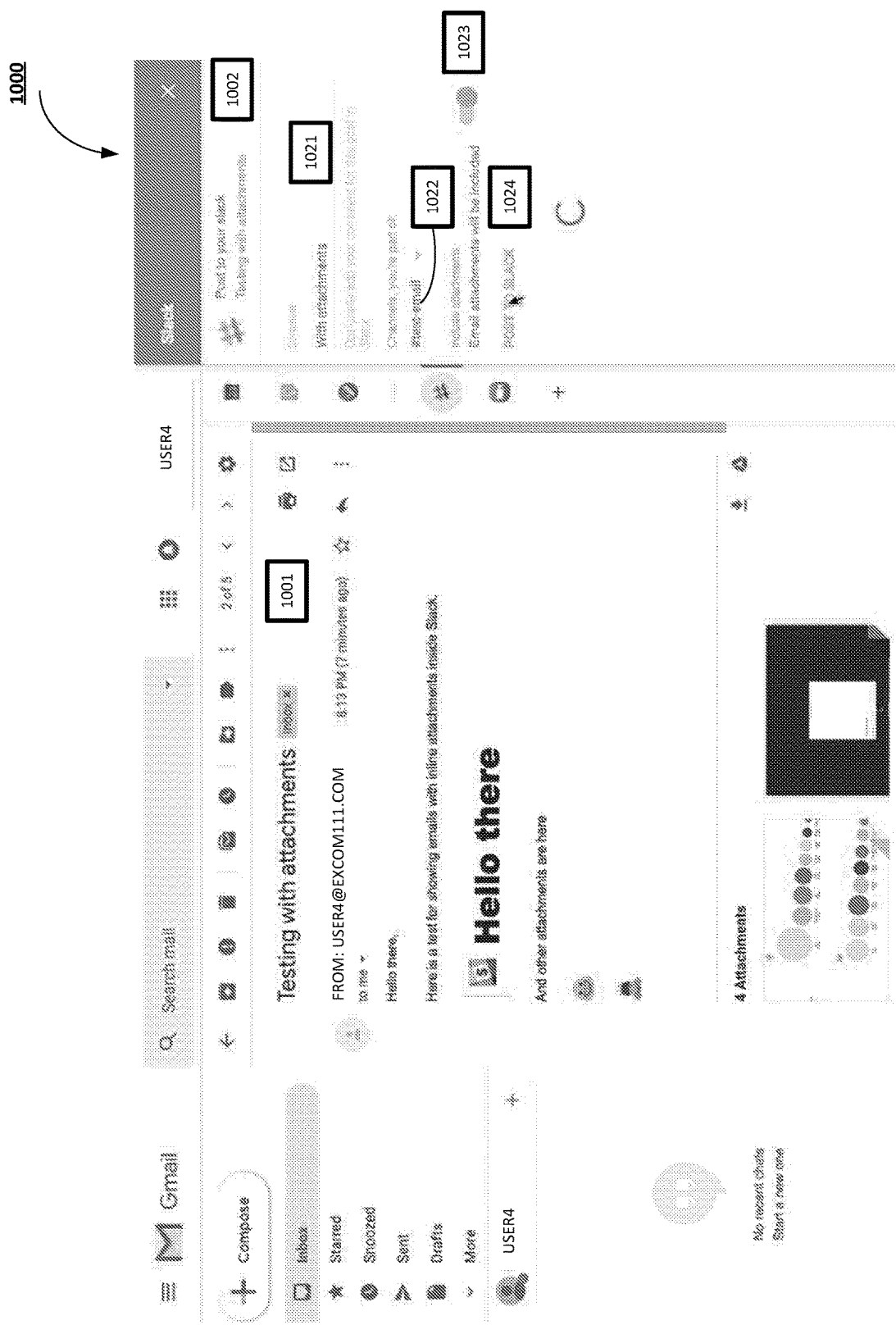

FIG. 10 provides an operational example of recommendation profile user interfaces in accordance with one embodiment of the present disclosure.

Figure 11:
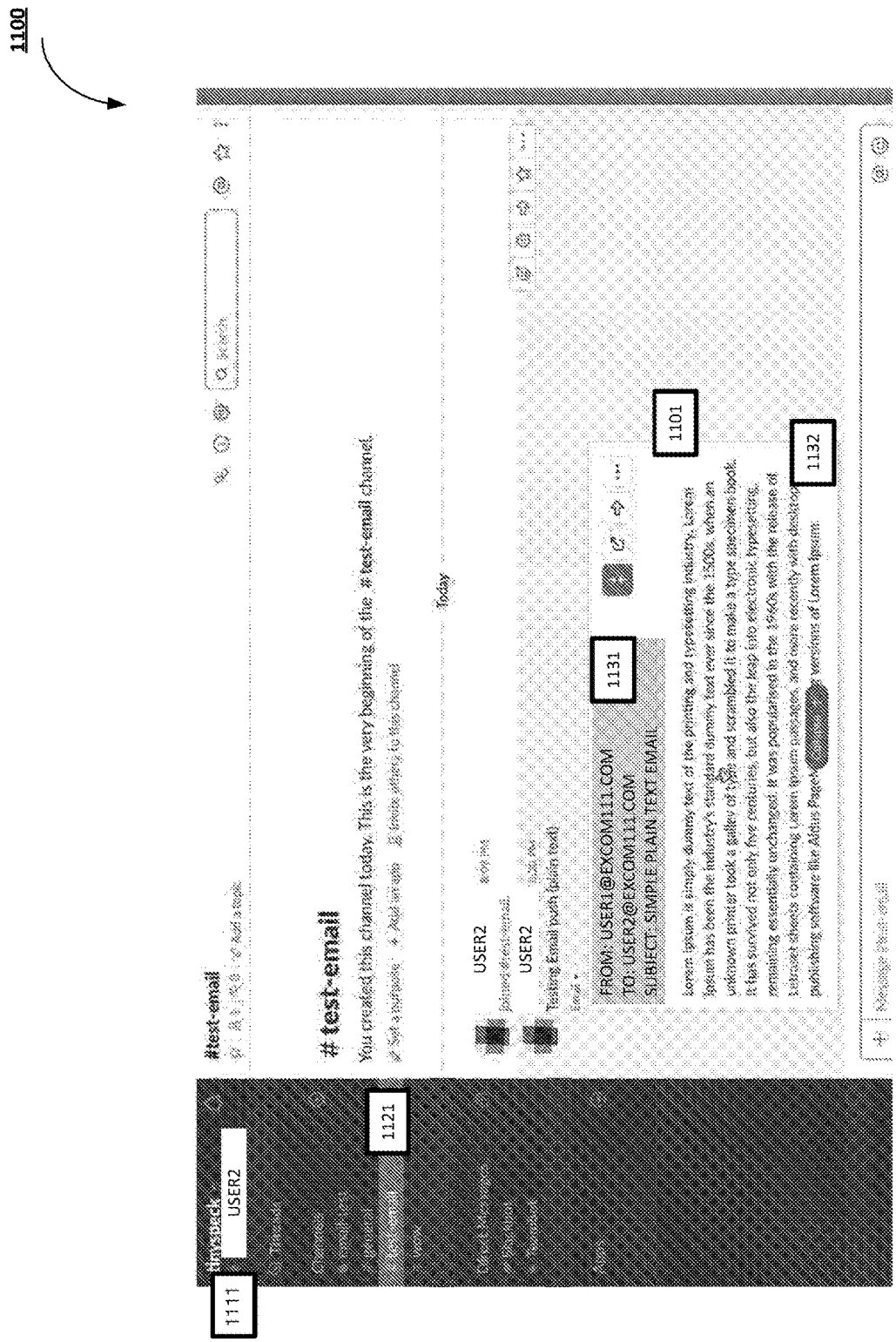

FIG. 11 provides an operational example of group-based communication user interfaces in accordance with one embodiment of the present disclosure.

Figure 12:
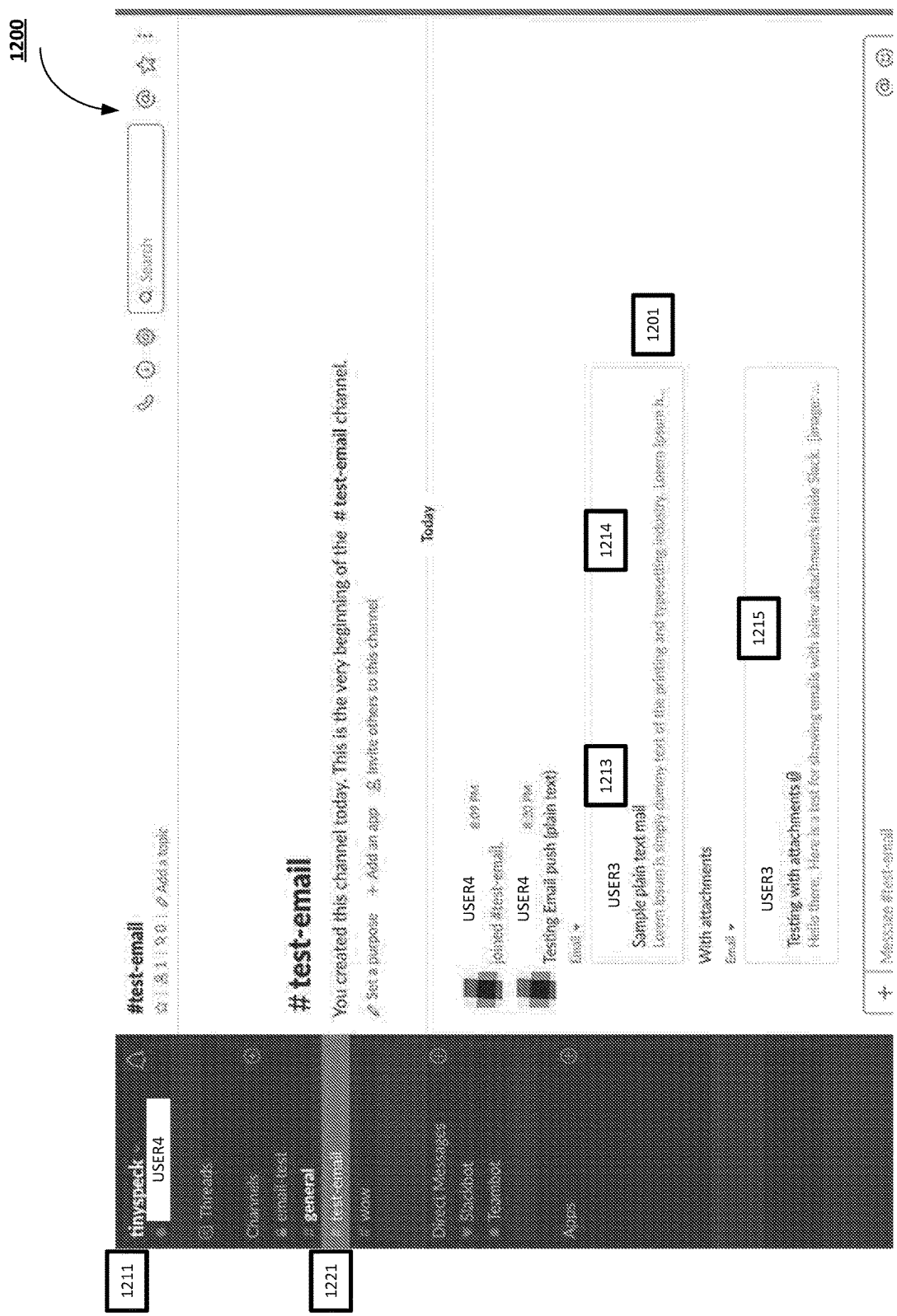

FIG. 12 provides an operational example of group-based communication user interfaces in accordance with one embodiment of the present disclosure.

Figure 13:
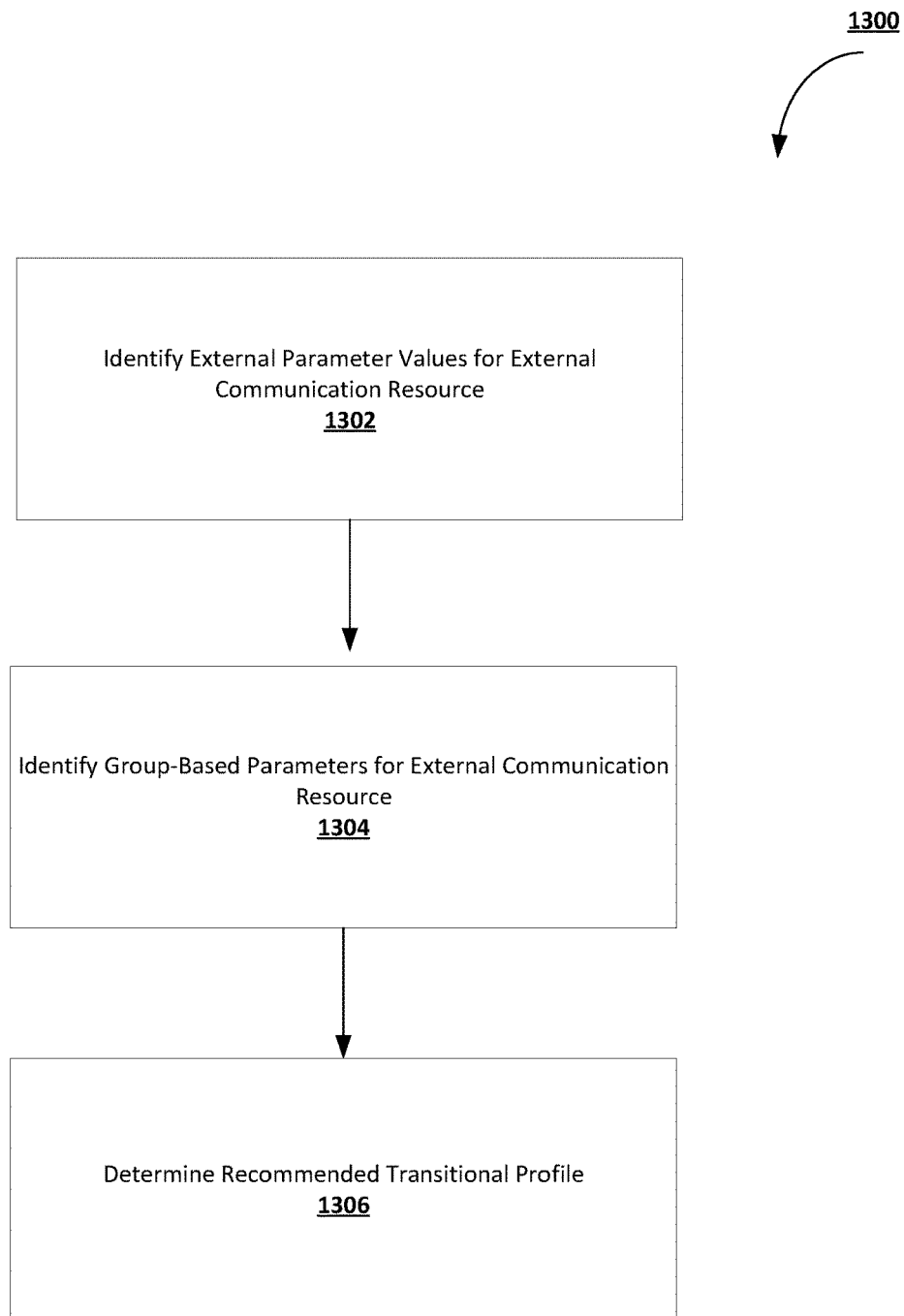

FIG. 13 is a flow diagram of an example process for determining a recommended transitional profile for an external communication resource in accordance with one embodiment of the present disclosure.

Figure 14:
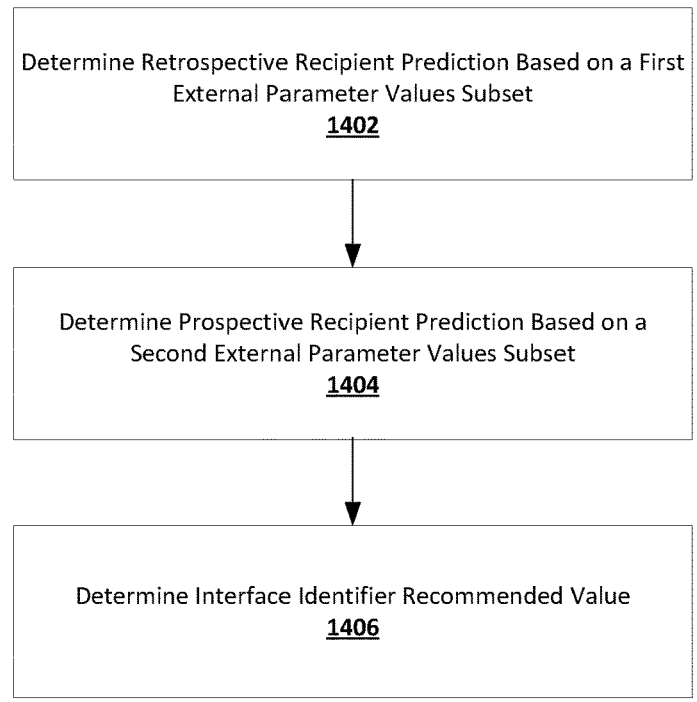

FIG. 14 is a flow diagram of an example process for determining an interface identifier recommended value for an external communication resource in accordance with one embodiment of the present disclosure.

DETAILED DESCRIPTION

Various embodiments of the present disclosure are described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements.

Overview

Various embodiments of the present disclosure relate generally to seamless communication resource transition between external communication systems. More specifically, various embodiments of the present disclosure are related to a resource transition server that performs seamless communication resource transition using at least one of recommended transitional profiles, retrospective recipient predictions, prospective recipient predictions, and/or client-side transition agents. Through using such techniques, various embodiments of the present disclosure enable substantial improvements in efficiency and effectiveness of communication resource transitions, especially communication resources transitions that involve group-based communication systems.

Many users and institutions continue to face challenges associated with multiplicity of communication systems utilized by those users and institutions. Among those challenges is the problem of communication resource transmission, such as transmission of communication resources from a first communication system having first communication protocols to a second communication system having second communication protocols. For example, the unique application-level protocols of group-based communication systems creates substantial problems for communication resource transmission between group-based communication systems and other communication systems. Facilitating such cross-platform resource transmission requires distributed coordination of data transfer across two or more communication systems as well as any client computing devices that may initiate communication resource transition, a requirement that may impose substantial computational and network costs on communication resource transition solutions. Adding to this complexity are the limitations imposed by security protocols adopted by communication standards as well as the need for cross-platform conversion of resource parameters. Thus, without effective solutions for limiting computational procedures required for communication resource transitions, network transmissions required for communication resource transitions, and cross-platform inconsistencies between data associated with various communication systems, become technically overwhelming.

Various other innovative aspects of the present disclosure improve efficiency and/or effectiveness of communication resource transmissions, such as communication resources transitions that involve group-based communication systems. For example, various embodiments of the present disclosure enable seamless communication resource transmission solutions that eliminate a need for user interaction with two distinct communication systems in order to facilitate communication resource transmissions. Various embodiments achieve this objective by performing operations configured to, for example, receive an interface display indication representative of a first user interface having an external communication resource visual representation; receive a seamless transition request for providing the seamless communication resource transition; in response to receiving the seamless transition request, transmit a second user interface having a recommended transitional profile visual representation and rendered for display in conjunction with the first user interface; receive an authorization input generated based on user interaction with the recommended transitional profile visual representation; and generate the seamless transition based on the authorization input.

By enabling seamless communication resource transitions, various embodiments of the present disclosure provide improvements by reducing the number of required system interactions and thus reduce the overall computational load of communication resource transmission. Moreover, seamless communication resource transmission further reduces the effective speed of communication resource transmissions by substantially reducing latency that results from delays in user response and/or user connectivity. By enabling such advantages, various embodiments of the present disclosure enable substantial improvements in efficiency and effectiveness of communication resource transitions, especially communication resources transitions that involve group-based communication systems.

As another example, various other innovative aspects of the present disclosure improve efficiency and/or effectiveness of communication resource transitions by transitional profile recommendations including generating prospective recipient predictions and retrospective recipient predictions. For example, to generate recommended transitional profiles for communication resources, various embodiments of the present disclosure perform operations configured to identify source parameter values for communication resources from source communication systems, map those source parameter values to destination parameter values for a destination communication resource, and determine recommended values for destination parameter values based on the destination parameter values obtained using the mapping. As another example, various embodiments of the present disclosure determine interface identifiers and channel identifiers for transmission of external communication resources to group-based communication resources, using at least one of prospective recipient prediction and retrospective recipient prediction. Such computations encourage user selections that can reduce cross-platform diversities and complications between various communication systems while giving predictability to a cost model associated with computational and/or network costs of communication resource transmissions.

Thus, through optimizing and clarifying network and/or computational cost outcomes associated with cross-platform resource transmission by adopting transitional profile recommendations including generating prospective recipient predictions and retrospective recipient predictions, various embodiments of the present disclosure enable substantial improvements in efficiency of communication resource transitions.

As yet another example, various other innovative aspects of the present disclosure relate to utilizing client-side transaction agents on client computing devices that facilitate various operations related to communication resource transition. Effective utilization of client-side capabilities can reduce the need for costly network transmissions that impose a substantial bottleneck on the efficiency and reliability of communication resource transmissions. Thus, by utilizing client-side transaction agents, various embodiments of the present disclosure enable substantial improvements in efficiency of communication resource transitions, such as communication resources transitions that involve group-based communication systems.

Therefore, various embodiments of the present disclosure substantially improve efficiency and effectiveness of communication resource transitions. In doing so, various embodiments of the present disclosure enable significant technological improvements, for example significant technological improvements in computer networking, in cross-platform integration techniques, and in communication data processing.

DEFINITIONS

The term "or" is used herein in both the alternative and conjunctive sense, unless otherwise indicated. The terms "illustrative," "example," and "exemplary" are used to be examples with no indication of quality level. Like numbers refer to like elements throughout.

The term "comprising" means "including but not limited to," and should be interpreted in the manner it is typically used in the patent context. Use of broader terms such as comprises, comprises, and having should be understood to provide support for narrower terms such as consisting of, consisting essentially of, and comprised substantially of The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

As used herein, the terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like (sometimes referred to herein as a "network"). Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "circuitry" should be understood broadly to include hardware and, in some embodiments, software for configuring the hardware. With respect to components of the apparatus, the term "circuitry" as used herein should therefore be understood to include particular hardware configured to perform the functions associated with the particular circuitry as described herein. For example, in some embodiments, "circuitry" may include processing circuitry, storage media, network interfaces, input/output devices, and the like.

The term "user" should be understood to refer to an individual, group of individuals, business, organization, and the like. The users referred to herein may access a communication system using client devices.

The term "user identifier" refers to an identifier that uniquely identifies information stored in a group-based communication system that is related to a user. Information related to a user may be stored in a "user profile," "user account," or "user account details," which may include one or more group-based communication channel identifiers associated with group-based communication channels that the user has been granted access privileges to, one or more group identifiers for groups that the user has been granted access privileges to, an indication as to whether the user is an owner of any group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., j doe), a password, a time zone, a status, and the like. The user account details can include a subset designation of user credentials, such as, for example, login information for the user including the user's username and password.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like. Client devices may be associated with a user of a group-based communication system. The association may be created by way of the client device transmitting registration information for the user to a group-based communication system. In some instances, a client device may be temporarily associated with a user (e.g., only when a user is logged onto the group-based communication system app). In such embodiments, the group-based communication system may receive registration information indicating the user is associated with a client device (e.g., a user may input a serial number of the client device to be associated with the user into the group-based communication system).

The term "communication system" refers to a software platform and associated hardware that is configured to enable computing devices associated with user accounts of the communication system to transmit communication resources associated with the user accounts and receive communication resources associated with the user accounts. Examples of communication systems include email communication systems, messaging communication systems, group-based communication systems, etc. For example, an email communication system may communicate with a first computing device associated with an email user account to receive a first email communication resource intended to be sent by the email user account to a recipient entity, transmit the first email communication to a second computing device associated with the recipient entity (e.g., associated with a communication system of the recipient entity), receive a second email communication resource intended to be sent to the email user account from a third computing resource associated with a sender entity, and transmit the second email communication resource to the first computing device associated with the email user account.

The term "communication resource" refers to a digital content item transmitted to a communication system by a computing device associated with a user account of the communication system in order to transmit to computing devices associated with one or more recipient entities and/or a digital content item transmitted by a communication system to a computing device associated with a user account of the communication from a computing device associated with a sender entity. Examples of communication resources include email communication resources, message communication resources, group-based communication resources, etc.

"Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation originated from one user who has been granted access to the group to another entity who has not been granted access to the group. Group identifiers are used to associate data, information, messages, etc., with specific groups.

The term "group-based communication system" refers to a communication system that is configured to support and maintain a plurality of group-based communication interfaces and support associated functionality. Group-based communication system users are organized into organization groups (e.g., employees of different companies may be separate organization groups) and each group interacts with the system via a respective group-based communication interface. For example, the group-based communication system might support, among others, a Slack Corporation group-based communication interface and an ACME Corporation group-based communication interface. Example group-based communication systems comprise supporting servers, client devices, and third party resources.

The term "group-based communication server" refers to a software platform and associated hardware that is configured to manage access to the various group-based communication interfaces of the group-based communication system. The group-based communication server is configured to access, maintain, and support application product logic of the group-based communication system and to access one or more data repositories such as a group-based communication repository.

The term "group-based communication interface" refers to an electronic visual rendering of a virtual communications environment configured to facilitate user interaction with a group-based communications system. Each group-based communication interface is accessible and viewable to a select group of users, such as a group of employees of a business or organization (e.g., the Slack Corp. interface would be accessible and viewable to the Slack employees but the ACME Corporation group-based communication interface would not be accessible and viewable to Slack employees). The group-based communication interface comprises one or more group-based communication channels (e.g., a marketing channel, sales channel, accounting channel, etc.).

The term "group-based communication channel" refers to a virtual communications environment or feed that is configured to display particular group-based communication resources (e.g., group-based messages) posted by channel members (e.g., validated user accounts accessing the environment using client devices) that are viewable only to the members of the group. The format of the group-based communication channel may appear differently to different members of the group-based communication channel; however, the content of the group-based communication channel (e.g., group-based messages resources) will be displayed to each member of the group-based communication channel. For instance, a common set of group-based messages may be displayed to each member of the respective group-based communication channel such that the content of the group-based communication channel (e.g., group-based messages resources) will not vary per member of the group-based communication channel.

The term "group-based communication resource" refers to a communication resource configured to be transmitted by a group-based communication system to a computing device of a user account of the group-based communication system. For example, group-based communication resources may include group-based messages rendered using a group-based communication interface and/or in a group-based communication channel associated with a group-based communication interface. As another example, a group-based communication resource may include group-based messages rendered using a messaging communication interface (e.g., a direct-message interface) of a group-based communication system and/or a messaging communication channel associated with a messaging communication interface of a group-based communication system.

The terms "group identifier" or "team identifier" refer to one or more items of data by which a group within a group-based communication system may be uniquely identified. For example, a group identifier may comprise ASCII text, a pointer, a memory address, and the like. For example, the group identifier associated with member users of a Slack Corporation workspace (i.e., a group-based communication interface) may be 104356721.

Group-based communication system users are organized into organization groups (e.g., employees of each company may be a separate organization group) and each organization group may have one or more group-based communication channels (explained below) to which users may be assigned or which the users may join (e.g., group-based communication channels may represent departments, geographic locations such as offices, product lines, user interests, topics, issues, and/or the like). A group identifier is used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

Group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

The term "group-based communication repository" refers to a location outside the client device where group-based communication data corpus is stored, accessed, modified and otherwise maintained by the group-based communication system. The stored data comprises information that facilitates the operation of the group-based communication system. The group based communication repository may be embodied as a data storage device or devices, as a separate database server or servers, or as a combination of data storage devices and separate database servers. Further, in some embodiments, the group-based communication repository may be embodied as a distributed repository such that some of the stored data is stored centrally in a location within the group-based communication system and other data stored in a single remote location or a plurality of remote locations. Alternatively, in some embodiments, the group-based communication repository may be distributed over a plurality of remote storage locations only.

The term "external communication system" refers to any communication system other than the particular group-based communication system. An external communication system may be configured in a manner that enables performing communication resource transitions between the external communication system and the particular group-based communication system. For example, the external communication system can be a communication system (e.g., a non-group-based communication system such as an email communication system or another group-based communication system other than the particular group-based communication system) that enables user accounts to utilize client-side transition agents to cause transition of a communication resource from the external communication system to the particular group-based communication system. An example of an external communication system is an external email resource.

The term "external email resource" refers to a validated external resource that takes the form of a software program, application, platform, or service that is configured to provide electronic mail ("email") services to users operating client devices. The external email resource comprises an email client, a simple mail transfer protocol ("SMTP") server, and a domain name server ("DNS"). The external email resource is configured to allow a sending user ("a sender") to create and transmit an email message to a receiving user ("a recipient"). Each email message comprises an email envelope that defines its electronic format, an email header that comprises sender/recipient information and an email subject line, and an email body that comprises text, images, and file attachments. The external email resource operates on a compiled code base or repository that is separate and distinct from that which supports the group-based communication system. Example external email resources include Microsoft Office 365®, Gmail®, and Yahoo Mail®. An external email resource may be associated with several external email resource entities of one or more users.

An email client of the external email resource may be used by a sender to create and transmit an email message.

The email message text and attachments are thus uploaded to the SMTP server as outgoing mail. A copy of the email message is stored to an email outbox associated with the sender for later retrieval. The SMTP server communicates with the DNS to find a recipient email server using recipient information drawn from the email header. Once the SMTP server finds the recipient email server, it transfers the email message to the recipient email server. The next time the recipient accesses the email client, the email client downloads the email message from the recipient email server for presentation to the recipient in an email inbox interface. The external email resource may also include programs, applications, platforms, or services configured to provide services related to providing email services.

An external email resource may transmit external message data comprising a group identifier and a group-based communication channel identifier to a group-based communication system. The group-based communication system may parse the external message data and render a group-based communication message based on the external message data to the group-based communication channel identified by the group-based communication channel identifier in the external message data.

The term "external communication resource" refers to a communication resource transmitted by an external communication resource. For example, when the external communication system is an email communication system, the external communication resource may be an email communication resource transmitted to a computing device associated with an email user account by the communication system. As another example, when the external communication system is a group-based communication system, the external communication system may be a group-based communication resource transmitted to a computing device associated with a group-based user account by the group-based communication system.

The term "external communication resource identifier" refers to one or more items of data by which an external communication resource may be uniquely identified. In some embodiments, the external communication resource identifier may comprise a number of characters (e.g., a number of American Standard Code for Information Interchange (ASCII) characters, such as ASCII alphanumeric or symbol characters, and/or a number of Unicode characters, such as Unicode alphanumeric or symbol characters).

The term "communication resource transition" between a group-based communication system and an external communication system refers to causing the group-based communication system to (e.g., by communicating with one or more other computing devices) transmit a group-based communication resource that comprises an indication of (e.g., all of the contents of and/or a link to) an external communication resource. For example, when the external communication resource is an email communication system, a communication resource transition between the group-based communication system and the external communication system may include transmitting an external communication resource to the group-based communication system in order to cause display of a group-based communication resource that comprises an indication of the email communication resource in a group-based communication channel of the group-based communication system.

The term "client-side transition agent" refers to a software framework installed on a client computing device utilizing an external communication system that enables a user of the client computing device to request a communication resource transition between the external communication system and a group-based communication system. For example, when the external communication system is an email communication system, the client-side transition agent may be a plugin for the email communication system that, when utilized by a user account associated with a computing device, enables the user account to cause display of (i.e., rendering within an interface) a group-based communication resource that comprises an indication of an email communication resource in a group-based communication channel of the group-based communication system.

The term "plugin" refers to a software component that enables an existing software framework to perform one or more functionalities. For example, a plugin for an email software framework may enable the email software framework to perform communication resource transition. A plugin may be an add-on and/or add-in software framework that runs in an environment provided by and/or based on constraints imposed by a primary software application, e.g., a third-party software application such as Outlook®. A plugin executing on a client computing device may communicate with one or more server computing devices, e.g., a server computing device associated with the plugin and/or with the primary software application.

The term "seamless communication resource transition" refers to a communication resource transition caused by user interaction with no more than one of a user interface of an external communication system associated with the communication resource transition or a user interface of a group-based communication system associated with the communication resource transition, where user interaction with a particular user interface may include performing a user action with respect to at least one user interface element of the particular user interface (e.g., an electronic selection of the at least one user interface element, for example by clicking on the at least one user interface element or touching the at least one user interface element). For example, when the external communication system is an email communication system, a seamless communication resource transition between the external communication system and a group-based communication system may include causing, based on interaction of a user with only a user interface of the email communication system (e.g., an interaction configured to execute a client-side transition agent and authorize a communication resource transition), display of (i.e., transmission for rendering in a group-based communication interface) a group-based communication resource that comprises an indication of an email communication resource in a group-based communication channel interface of the group-based communication system.

The term "seamless transition request" refers to data transmitted by a first computing device (e.g., a client computing device) to a second computing device (e.g., a resource transition server) that requests that the second computing device cause a group-based communication system to perform a communication resource transition, where the transition is caused by user interaction with no more than one of a user interface of an external communication system associated with the communication resource transition or a user interface of the group-based communication system associated with the communication resource transition. For example, the seamless transition request may be a request (e.g., a Hyper-Text Transfer Protocol (HTTP) request) by a client device to a server device that causes the server device to generate and transmit seamless communication resource transition instructions to a group-based communication system.

The term "seamless communication resource transition instruction" refers to a computer instruction (e.g., a high-level programming language instruction, low-level assembly instruction, machine-code instruction, etc.) that (alone or in combination with one or more seamless communication resource transition instructions) that, when executed by a group-based communication system, causes the group-based communication system to perform a communication resource transition. For example, a server device may transmit one or more seamless communication resource transition instructions as HTTP data to a group-based communication system in order to cause the group-based communication system to execute the one or more seamless communication resource transition instructions and perform communication resource transition with an external communication system.

The term "user interface" refers to data encoding any combination of one or more visual representations configured to be displayed to a user of a computing device by a display device of the computing device. In some embodiments, a user interface may include one or more visual representations that represent a state of a communication system at a particular time. For example, at least one of the one or more visual representations may render an email communications resource transmitted to a computing device of a user account by an email communication system on or before a particular time. As another example, at least one of one or more visual representations may render a group-based communication resource transmitted to a computing device of a user account by a group-based communication system.

The term "interface display indication" refers to data transmitted to a computing device that, when processed (e.g., executed) by the computing device, causes the computing device to display a user interface on a display device of the computing device. For example, the interface display indication may be Hyper-Text Markup Language (HTML) code configured to be executed by a web browser software framework executing on the computing device. As another example, the interface display indication may be data configured to be used by an mobile application software framework (e.g., an email communication application software framework) executing on a mobile computing device to cause display of a user interface associated with the mobile application software framework.

The term "external communication resource visual representation" is a combination of one or more electronically-displayed visual entities configured to represent data associated with an external communication resource, the visual entities for rendering for display within a user interface. For example, when an external communication resource is an email communication resource, the external communication resource visual representation of the email communication resource may represent data associated with contents of the email communication resource.

The term "in conjunction to," when used in relation to two or more user interfaces, refers to any arrangement of positioning of the two or more user interfaces on a display device that causes a temporally simultaneous and/or a temporally consecutive display of the two or more user interfaces on the display device. For example, a temporally simultaneous display of two user interfaces may include display of the two user interfaces side-by-side, in a stacked arrangement, or otherwise simultaneously at the same time on the same display device. As another example, a temporally consecutive display of two user interfaces may include display of one user interface as an overlay on the other user interface.

The term "variable property" of a communication resource refers to any property of a communication resource that is not shared by all of the communication resources associated with a communication system configured to transmit the communication resource. For example, with respect to an email communication resource, variable properties of the communication resource may relate to a sender identifier for the email communication resource, a timestamp of the email communication resource, a subject-line of the email communication resource, etc. As another example, with respect to a group-based communication resource, variable of the communication resource may relate to a sender identifier for the group-based communication resource, a group-based communication interface associated with the group-based communication resource, a group-based communication channel associated with the group-based communication resource, a timestamp for the group-based communication resource, etc.

The term "recommended value" for a variable property of a communication resource refers to a predicted value programmatically generated by a software framework representative of an optimal and/or relevant value for the communication resource, e.g., an existing communication resource and/or a communication resource configured to be generated in the future. For example, with respect to a variable property related to a group-based communication interface of a group-based communication resource, the recommended valuefor the variable property may indicate a predicted optimal group-based communication interface for rendering the group-based communication resource.

The term "external parameter" refers to a variable property of an external communication resource. Examples of external parameters include heading external parameters, attachment external parameters, content-based external parameters, communication type external parameters, etc.

The term "content-based external parameter" refers to an external parameter for an external communication resource that relates to (e.g., whose value indicates or is representative of) at least a portion of the external communication resource (e.g., a body portion of the email communication resource). For example, when the external communication resource is an email communication resource, a content-based external parameter may relate to at least one of a subject-line of the email communication resource and a body of the email communication resource.

The term "heading external parameter" refers to an external parameter for an external communication resource that relates to a heading identifier and/or subject identifier for the external communication resource. For example, when the external communication resource is an email communication resource, a heading external parameter may relate to a subject-line of the email communication resource.

The term "attachment external parameter" refers to an external parameter for an external communication resource that relates to a quantity, address, and/or identification of a number of file attachments for the external communication resource. For example, when the external communication resource is an email communication resource, an attachment external parameter may relate to identifiers of one or more attachments for the email communication resource.

The term "communication type" for a communication resource refers to a variable property of a communication resource that defines or uniquely identifies a real-organizational function of the communication resource. Examples of communication type may include email communication type, calendar invite communication type, teleconference invite communication type, etc.

The term "real-world organization function" for a communication resource refers to a property of the communication resource that relates to a nature of expected interaction by recipients of the communication resource with the communication resource. For example, with respect to an email communication resource having an email communication type, the expected interaction by recipients may be to read and/or respond to the email communication response with a responsive email communication resource. As another example, with a respect to a calendar invite communication resource having a calendar invite communication type, the excepted interaction by recipients may be to accept or reject the calendar invite communication resource and participate in the corresponding calendar event accordingly. As yet another example, with a respect to a teleconference invite communication resource having a teleconference invite communication type, the excepted interaction by recipients may be to accept or reject the teleconference invite communication resource and participate in the corresponding teleconference event accordingly.

The term "external communication type" for an external communication resource refers to an external parameter for the external communication resource that relates to a communication type of the external communication resource. For example, an external communication type for an external communication resource may include whether the external communication resource is associated with one or more of an email communication type, a calendar invite communication type, a teleconference invite communication type, etc.

The term "external parameter value" refers to an electronic value assigned to an external parameter for an external communication resource. For example, the value assigned to an attachment parameter for an email communication resource (i.e., an external communication resource) may indicate the quantity and/or the identifiers of one or more attachments for the email communication resource.

The term "external parameters set" refers to a data structure comprising a plurality of external parameters (i.e., variable properties) of an external communication resource.

The term "external parameter values sub set" refers to a plurality of one or more external parameter values for an external communication resource, the plurality of the one or more external parameters being a subset of the plurality of external parameters in the external parameters set of the external communication resource. The external parameters values subset comprises those external parameter values that can (e.g., upon further processing by a software framework) indicate a group-based recommended value for a group-based parameter of an external communication resource. For example, a software framework may be configured to process an external parameter values subset that comprises an external parameter value for an external content parameter of an external communication resource and an external heading parameter value for an external heading parameter of the external communication resource to determine an interface identification parameter for a group-based communication resource that comprises an indication of the external communication resource.

The term "content-based external parameter value" refers to an electronically-stored value assigned to a content-based external parameter for an external communication resource. For example, when the external communication resource is an email communication resource, a content-based external parameter value may be determined based on at least one of a subject-line of the email communication resource and a body of the email communication resource. An example content-based external parameter value for an email communication resource comprises a text string associated with the body of the email communication resource.

The term "contextual external parameter value" refers to an electronically-stored value assigned to an external parameter for an external communication that is at least in part determined (e.g., by a software framework) based on at least one feature of the external communication resource other than the external communication resource itself or a portion thereof. For example, when the external communication resource is an email communication resource, a contextual parameter value may be determined based on at least one of a timestamp for the email communication resource and/or a sender identifier for the email communication resource. An example contextual external parameter value for an email communication resource comprises an email address associated with a sender of the email communication resource.

The term "group-based parameter" for an external communication resource refers to a variable property of a group-based communication resource that comprises an indication of (i.e., data associated with and/or renders) the external communication resource. Each group-based parameter is thus associated with an external communication resource as well as a group-based communication resource that comprises an indication of the external communication resource (e.g., an existing group-based communication resource and/or a group-based communication resource configured to be generated in the future). Examples of group-based parameters include interface identification parameters, channel identification parameters, heading group-based parameters, attachment group-based parameters, content group-based parameters, group-based communication type parameters, etc.

The term "interface identification parameter" refers to a group-based parameter for a group-based communication resource whose value uniquely identifies one or more group-based communication interfaces associated with the group-based communication resource. For example, when a group-based message in a group-based communication system is rendered in a group-based communication channel of a first group-based communication resource, the value of the group-based identification parameter for the group-based message may indicate or represent the first group-based communication channel interface. In such an example, the value of the interface identification parameter may comprise a group-based communication interface identifier associated with the first group-based communication channel interface.

The term "channel identification parameter" refers to a group-based parameter for a group-based communication resource whose value defines or uniquely identifies one or more group-based communication channels associated with the group-based communication resource. For example, when a group-based message in a group-based communication system is rendered in a first group-based communication channel interface associated with a group-based communication channel of a group-based communication resource, the value of the group-based identification parameter for the group-based message may indicate or represent the first group-based communication channel.

The term "content group-based parameter" refers to a group-based parameter fora
 group-based communication resource that relates to (e.g., whose value indicates or is representative of) at least a portion of the group-based communication resource (e.g., a message portion of the group-based communication resource). For example, when the external communication resource is an email communication resource, a content-based external parameter may relate to at least one of a subject-line of the external communication resource and a body of the external communication resource.

The term "heading group-based parameter" refers to a group-based parameter for a group-based communication resource that relates to a heading identifier and/or subject identifier for an associated external communication resource. For example, when the group-based communication resource is a group-based message, a heading group-based parameter may relate to a subject-line of the group-based message.

The term "attachment group-based parameter" refers to a group-based parameter for a group-based communication resource that relates to a quantity, address, and/or identification of a number of file attachments for the group-based communication resource. For example, when the group-based communication resource is a group-based message, an attachment external parameter may relate to identifiers of one or more attachments for the group-based message.

The term "group-based communication type" for a group-based communication resource refers to a group-based parameter for the communication resource that relates to a communication type of the group-based communication resource. For example, a group-based communication type for a group-based communication resource may include whether the group-based communication resource is associated with one or more of a message communication type, a calendar invite communication type, a teleconference invite communication type, etc. The group-based communication type for a group-based communication resource that comprises an indication of an external communication resource may be determined based on the external communication type of the external communication resource.

The term "group-based parameter value" refers to an electronically-stored value assigned to a group-based parameter for a group-based communication resource. For example, the value assigned to an interface identification parameter (i.e., a group-based parameter value) may represent an interface identifier of one or more group-based communication interfaces that are associated with a group-based communication resource.

The term "interface identifier" for a group-based communication resource refers to one or more items of data by which a group-based communication interface associated with the group-based communication resource may be uniquely identified. For example, an interface identifier may comprise a value assigned to an interface identification parameter for the group-based communication resource. In some embodiments, the interface identifier for a particular group-based communication resource may indicate one or more first group-based communication interfaces associated with the particular group-based communication resource.

The term "channel identifier" for a group-based communication resource refers to one or more items of data by which a group-based communication channel associated with the group-based communication channel may be uniquely identified. For example, a channel identifier may include a value assigned to a channel identification parameter for the group-based communication resource. For example, the channel identifier for a particular group-based communication resource may indicate one or more first group-based communication channels associated with the particular group-based communication resource.

The term "group-based recommended value" refers to a programmatically generated recommended value to be assigned to a group-based parameter of a group-based communication resource (e.g., an existing group-based communication resource and/or a group-based communication resource) configured to be generated by a communication resource transition and based on an external communication resource. For example, the group-based recommended value for a group-based identification parameter may comprise a group-based interface identifier associated with a recommended group-based interface for which a group-based communication resource is configured to be generated by a communication resource transition and based on an external communication resource.

The term "interface identifier recommended value" refers to a programmatically generated recommended value for a group-based identification parameter value for a group-based communication resource. For example, the interface identifier recommended value for a group-based communication resource may comprise one or more group-based communication interface identifiers associated with group-based communication interfaces that have been programmatically identified or predicted as optimal and/or most relevant for rendering the group-based communication resource.

The term "recommended transition profile" for an external communication resource refers to a data structure that comprises a group-based recommended value for at least one group-based parameter for the external communication resource, as well as an external communication resource identifier associated with the external communication resource. For example, the recommended transitional profile may include a group-based recommended value for each group-based parameter for the external communication resource.

The term "recommended transitional profile visual representation" refers to a visual representation that depicts, via a display of a computing device, a representation of each recommended value associated with a recommended transitional profile. The recommended transitional profile visual representation may be part of a user interface for an external communication system. Furthermore, the recommended transitional profile visual representation may enable a user account to interact with a client-side transition agent associated with an external communication system.

The term "transitional profile recommendation routine" refers to computer instructions that, when executed, cause a computing device to generate a recommended transitional profile. Individual steps of a transitional profile recommendation routine may be performed by a server device configured to cause a group-based communication system to perform communication resource transition and/or by a computing device associated with a group-based communication system.

The term "retrospective recipient prediction" for a particular external communication resource refers to data indicating one or more group-based user accounts of a group-based communication systems that are determined to have significant past association with data associated with other one or more external communication resources that have external property values deemed to be similar or related to the external property of the particular external communication resource. For example, the retrospective recipient prediction for a particular external communication resource may indicate one or more group-based user accounts of a group-based communication systems that are determined to have significant past interaction with other one or more external communication resources whose respective external parameters have significant commonality with the external parameters of the particular external communication resource. As another example, the retrospective recipient prediction for a particular external communication resource may indicate one or more group-based user accounts of a group-based communication systems that are determined to have significant past interaction with other one or more group-based communication resources, where the one or more group-based communication resources are associated with one or more external communication resources whose respective external parameters have significant commonality with the external parameters of the particular external communication resource.

The term "user resource interaction event" refers to one or more of transmission of a communication resource by a communication system to a computing device associated with a user account, transmission of a communication resource from a computing device associated with a user account to a communication system, and/or performance of an action by a user account with respect to a communication resource. Examples of user resource interaction events include receiving communication resources, posting (e.g., transmitting for rendering) communication resources (e.g., to group-based communication channels), sending communication resources, viewing body of communication resources, viewing attachment files for communication resources, deleting communication resources, marking communication resources as spam, etc.

The term "past interaction event" refers to a user resource interaction event whose timestamp indicates or is representative of that the user resource interaction event has occurred at a time prior to retrieval of data recording the user resource interaction event. Examples of past interaction events include past events related to receiving communication resources, posting communication resources (e.g., to group-based communication channels), sending communication resources, viewing body of communication resources, viewing attachment files for communication resources, deleting communication resources, marking communication resources as spam, etc.

The term "past interaction association" refers to a variable whose value denotes a magnitude, frequency, and/or quantity of one or more past interaction events that involve one or more user accounts deemed related to a particular user account for a communication system and one or more resources deemed related to a particular communication resource. For example, a past interaction association between a particular group-based user account and a particular external communication resource may represent one or more past interaction events between the particular group-based communication account and one or more group-based communication resources that include identifiers of external communication resources deemed related to the particular external communication resource.

The term "historical data" for a communication system refers to data that represents at least one past interaction event associated with the communication system. For example, historical data may be stored (e.g., as log data) in a storage unit associated with a server device configured to generate seamless communication resource transition instructions.

The term "prospective recipient prediction" for a particular external communication resource refers to data representing one or more group-based user accounts of a group-based communication systems that are programmatically predicted to have significant future interest in data associated with the particular external communication resource, e.g., with a group-based communication resource that comprises an indication of the particular external communication resource. For example, the retro prospective recipient prediction for a particular external communication resource may identify one or more group-based user accounts of a group-based communication systems that are predicted to have significant future interest in an inferred subject matter designation of the particular external communication resource and/or an inferred subject matter designation of a group-based communication resource associated with the particular external communication resource.

The term "future interest prediction" for a particular user account of a communication system and a particular communication resource refers to a variable whose value denotes a predicted level of engagement by the user account with one or more communication resources whose inferred subject matter designation is deemed similar to the inferred subject matter designation of the particular communication resource. For example, the future interest prediction for a particular user account of a communication system and a particular communication resource may relate to a predicted level of interest by the particular user account in an inferred subject matter designation of the particular communication resource, where the predicted level of engagement may be determined at least in part based on historical data.

The term "inferred subject matter designation" for a communication resource refers to a designation and/or a classification of the communication resource based on at least a portion of the communication resource, e.g., one or more of a heading and a body of the communication resource. For example, the inferred subject matter designation for a communication resource may comprise one or more of a technology designation, a sport designation, a news designation, etc.

The term "subject matter interest designation data" for a user account (e.g., a group-based user account) refers to data representative of one or more topics deemed and/or predicted to be of significant interest to the user account. For example, the subject matter interest designation data for a user account may represent that the user account is interested in technology.

The term "interface subject matter designation data" for a group-based communication interface refers to data representative of one or more topics deemed and/or predicted to be of significant interest to one or more group-based users associated with the group-based communication interface and/or of significant relevance to one or more group-based communication resources associated with the group-based communication interface. For example, the interface subject matter designation data for a group-based communication interface may represent that one or more group-based communication resources associated with the group-based communication interface relate to an ABC corporation.

The term "channel subject matter designation data" for a group-based communication channel refers data representative of one or more subject matters deemed and/or predicted to be of significant relevance to one or more group-based communication resources associated with the group-based communication channel. For example, the channel subject matter designation data for a group-based communication channel may represent that one or more group-based communication resources associated with the group-based communication channel relate to machine learning research.

The term "authorization input" refers to data representative of a user action by a user account of a communication system that is configured to indicate a desire by the user account to perform a particular communication resource transition involving the communication system. For example, the authorization input may include data representative of a user clicking and/or touching a user interface element, where the clicking and/or touching is configured to transmit a request on behalf of the user to perform a particular communication resource transition involving the communication system. The authorization input may include a selected user value entered by a user account for each group-based parameter of at least one group-based parameter associated with the communication resource transition.

The term "authorization input user interface element" refers to a visual representation that is part of a user interface, where interaction by a user account with the visual representation enables the user account to supply an authorization input. For example, the authorization input user interface element may be a button that, when clicked on and/or touched by a user account, will transmit on behalf of the user account a request to perform a particular communication resource transition involving the communication system.

The term "selected user value" refers to data representative of a user-defined value entered by a user account for at least one group-based parameter associated with an external communication resource. For example, a user account may enter a selected user value for an interface identification parameter associated with an external communication resource that may or may not be different from the interface identifier recommended value for the external communication resource.

The term "transition input user interface element" refers to a visual representation that is part of a user interface, where interaction by a user account with the visual representation enables the user account to enter a selected user value for at least one group-based parameter associated with an external communication resource. For example, a transition input user interface element may be an entry in a form visual representation that enables the user account to enter a selected user value for an interface identification parameter for an external communication resource. The transition input user interface element may be configured to display a depiction of a selected user value associated with the transition input user interface element in response to user action intended to enter the selected user value.

The term "transition input user interface element default value" refers to a value depicted by the transition input user interface element prior to any user interaction to enter a selected user value. For example, the transition input interface element default value for a transition input user interface element may be the recommended value for a group-based parameter associated with the transition input user interface element. The transition input user interface element default value may be depicted in the transition input user interface element by a color that is different (e.g., is lighter than) a color depicting a corresponding selected user interface value by the transition input user interface element.

The term "external database" for an external communication system refers to one or more computing resources configured to enable storage and/or retrieval of data associated with the external communication system. For example, an external database for an email communication system may be configured to enable storage and/or retrieval of external communication resources associated with the email communication system. As another example, an external database for an email communication system may be configured to enable storage and/or retrieval of metadata for external communication resources associated with the email communication system The term "access privilege mode" refers to a variable whose value denotes a nature and/or extent of access by a computing device (e.g., a computing device associated with a recognized entity and/or user profile) to data associated with an external database. An access privilege mode may define which data stored by an external database a computing device associated with a recognized entity may access. For example, a first access privilege mode may enable a computing device associated with a recognized entity to access all data associated with the external database. As another example, a second access privilege mode may enable a computing device associated with a recognized entity to access metadata associated with the external database. As a further example, a third access privilege mode may enable a computing device associated with a user account to access all data associated with the user account. As yet another example, a fourth access privilege mode may enable a computing device associated with a user account to access metadata associated with the user account.

The term "natural language processing module" refers to a software framework that processes natural language data (e.g., human language data, such as unstructured human language data) to extract one or more features from the natural language data and/or to perform one or more predictions based on the natural language data. For example, a natural language processing module may process natural language data associated with a communication resource to determine an inferred subject matter designation for the communication resource. A natural language processing module may use one or more syntactic processing techniques and/or one or more semantic processing techniques. For example, a natural language processing module may use one or more of the following techniques: grammar induction, lemmatization, morphological segmentation, part-of-speech tagging, parsing, sentence boundary disambiguation, word segmentation, terminology extraction, lexical semantic determination, named entity recognition, optical character recognition, textual entailment recognition, relationship extraction, sentiment analysis, topic segmentation, word sense disambiguation, automatic segmentation, speech segmentation, text-to-speech conversion, etc.

The term "significant," when used in relation to a property or a relationship, refers to one or more of the following: (i) the value of the property or the value of a property indicating a magnitude of the relationship exceeds a threshold value (e.g., a predefined threshold value determined based on configuration data); (ii) the value of the property or the value of a property indicating a magnitude of the relationship is among a first number of highest corresponding values among one or more entities associated with the value, where the first number may be pre-defined based on configuration data. For example, significant past interaction association with a group-based user account associated with a particular group-based communication system may indicate that a value associated with the association exceeds a threshold value and/or the value associated with the association is among the top n highest association values for group-based user accounts associated with the particular group-based communication system. As another example, significant future interest prediction with a group-based user account associated with a particular group-based communication system may indicate that a value associated with the prediction exceeds a threshold value and/or the value associated with the prediction is among the top m highest association values for group-based user accounts associated with the particular group-based communication system.

Example System Architecture for Implementing Embodiments of the Present Disclosure Methods, apparatuses, and computer program products of the present disclosure may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example system architecture 100 within which embodiments of the present disclosure may operate. The architecture 100 comprises a client computing device 101 configured to execute a client application 102; a group-based communication system 105 that comprises a group-based communication server 106, a group-based communication repository 107, and a resource transition server 108; and an external communication system 111 that comprises an external communication server 112 and an external communication repository 113. In response to a user interaction with the client application 102 configured to indicate a desire for a communication resource transition, the architecture 100 is configured to obtain an authorization input for the seamless communication resource transition from the user and perform the seamless communication resource transition based on the authorization input.

Some or all of the various components of the architecture 100 (e.g., the client computing device 101, the group-based communication server 106, the group-based communication repository 107, the resource transition server 108, the external communication server 112, and the external communication repository 113) may communicate with each other using a communication network (not shown). The communication network may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, the communication network may include a cellular telephone, an 902.11, 902.16, 902.20, and/or WiMax network. Further, the communication network may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In one embodiment, the protocol is a custom protocol of JSON objects sent via a Websocket channel. In one embodiment, the protocol is JSON over RPC, JSON over REST/HTTP, and the like.

The client computing device 101 may be any computing device as defined above. Electronic data received by the group-based communication system 105 and/or by the external communication system 111 from the client computing device 101 may be provided in various forms and via various methods. For example, the client computing device 101 may include desktop computers, laptop computers, smartphones, netbooks, tablet computers, wearables, and the like. An example architecture for a client computing device 101 is depicted in the apparatus 300 of FIG. 3. The client computing device 101 may be configured to communicate with the group-based communication system 105 and the external communication system 111.

The client application 102 may be configured to facilitate communications between the client computing device 101 and both of the group-based communication system 105 and the external communication system 111, provide data retrieved from the group-based communication system 105 and the external communication system 111 to the user, and obtain user input in response to the provided data. For example, the client application 102 may retrieve external communication resources (e.g., email communication resources) associated with the external communication system 111 from the external communication system 111, display the retrieved external communication resources to the user, obtain inputs from the user related to the communication resource transition, generate a seamless transition request for the communication resource transition, and transmit the seamless transition request to the resource transition server 108. The client application 102 may, for example, be a web browser application or another software application configured to enable the user to retrieve the external communication resources, e.g., a client-side email management application such as Microsoft® Outlook®.

In embodiments where client computing device 101 is a mobile device, such as a smart phone or tablet, the client application 102 may be a smartphone "app." Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system. Additionally or alternatively, the client computing device may interact with the group-based communication system 105 via a web browser. As yet another example, the client computing device 101 may include various hardware or firmware designed to interface with the group-based communication system 105.

The client application 102 comprises an external communication system application programming interface (API) 103, a rendering engine 104, and a client-side transition agent 115. The external communication system API 103 may be configured to retrieve external communication resources (e.g., emails) by communicating with the external communication server 112 (e.g., an email server) and provide the retrieved external communication resources to the rendering engine 104. The external communication system API 103 may communicate with the external communication server 112 using an application-level data retrieval protocol, such as the Internet Message Access Protocol (IMAP), the Post Office Protocol (POP3), or the Simple Mail Transfer Protocol (SMTP). The external communication system API 103 is further configured to retrieve external parameter values for external communication resources (e.g., email metadata)

and provide the retrieved external parameter values to the client-side transition agent 115.

The rendering engine 104 may be configured to receive the retrieved external communication resources from the external communication API 103 and render first user interfaces that each depict an external communication resource visual representation associated with a retrieved external communication resource. The rendering engine 104 may be further configured to detect and notify the client-side transition agent 115 of user interactions with the first user interfaces configured to request seamless communication resource transitions of the external communication resources from the external communication system 111 to the group-based communication system 105 (e.g., user clicks on user interface elements in the first user interfaces that are associated with the client-side transition agent 115). The rendering engine 104 may be further configured to receive recommended transitional profiles from the client-side transition agent 115 and use the recommended transitional profiles to render second user interfaces that depict recommended transitional profile visual representations for the external communication resources. The rendering engine 104 may be further configured to detect and notify the client-side transition agent 115 of user interactions with the second user interfaces configured to generate authorization inputs.

The client-side transition agent 115 may be configured to receive notifications of detected user interactions from the rendering engine 104. In response to receiving notifications of detected user interactions configured to request seamless communication resource transitions, the client-side transition agent 115 may be configured to generate seamless transition requests based on the notifications and transmit the seamless transition requests to the resource transition server 108. In response to receiving notifications of detected user interactions configured to generate authorization inputs, the client-side transition agent 115 may be configured to generate seamless transition requests and transmit the seamless transition requests to the resource transition server 108. Furthermore, the client-side transition agent 115 may be configured to receive recommended transitional profiles for seamless transition requests from the resource transition server 108 and provide the recommended transitional profiles to the rendering engine 104. Moreover, the client-side transition agent 115 may be configured to provide data related to group-based communication resources to and/or receive data related to group-based communication resources from the group-based communication server 106.

The group-based communication system 105 may be configured to provide various functionalities related to group-based communication resources and/or related to communication resource transitions to the client application 102. For example, the group-based communication system 105 may be configured to provide group-based communication resources to the client application 102, receive seamless transition requests from the client application 102, and perform seamless communication resource transitions in response to the received seamless transition requests. An example group-based communication system 105 is the server-side system associated with the Slack® software application.

The group-based communication server 106 may be embodied as a computer or computers as configured herein. An example architecture for the group-based communication server 106 is depicted in the apparatus 200 of FIG. 2. The group-based communication server 106 may provide for sending electronic data and/or receiving electronic data from various sources, including but not limited to the client computing device 101 and/or the resource transition server 108. For example, the group-based communication server 106 may send to the client computing device 101 one or more group-based communication resources associated with the client application 102, e.g., one or more group-based communication resources associated with at least one group-based communication interface and/or at least one group-based communication channel that is associated with a group-based user account of the client application 102. As another example, the group-based communication server 106 may receive requests for generation of new group-based communication resources from the client computing device 101, e.g., in order to generate the new group-based communication resources. As a further example, the group-based communication server 106 may receive requests for modification of data stored in the group-based communication repository 107 from at least one of the client computing device 101 and the resource transition server 108, e.g., in order to perform the requested modifications. As yet another example, the group-based communication server 106 may receive seamless transition instructions from the resource transition server 108, e.g., in order to perform the seamless transition instructions.

The group-based communication repository 107 may be embodied as a data storage device such as a Network Attached Storage (NAS) device or devices, or as a separate database server or servers. The group-based communication repository 107 may be configured to store electronic data accessed and stored by the group-based communication server 106 to facilitate the operations of the group-based communication server 106 and/or the resource transition server 108. For example, the group-based communication repository 107 may include electronic data related to group-based communication resources associated with the group-based communication system 105, such as data related to group-based communication interfaces and/or group-based communication channels associated with the group-based communication system 105. As another example, the group-based communication repository 107 may include electronic data related to seamless transition requests received by the resource transition server 108 from the client-side transition agent 115 and/or electronic data related to external parameter values retrieved by the resource transition server 108 from the external communication server 112.

The resource transition server 108 may be embodied as a computer or computers as known in the art. An example architecture for the resource transition server 108 is depicted in the apparatus 400 of FIG. 4. The resource transition server 108 may be configured to perform seamless communication resource transitions by interacting with at least one of the client application 102, the group-based communication server 106, the group-based communication repository 107, and the external communication system 111. For example, the resource transition server 108 may be configured to receive seamless transition requests from the client application 102 in response to user interaction with first user interfaces, identify external communication resources associated with the received seamless transition requests, retrieve external parameter values associated with the identified external communication resources, generate recommended transitional profiles for the received seamless transition requests based on the retrieved external parameter values, generate second user interfaces based on the generated recommended transitional profiles, and provide the generated second user interfaces to the client application 102 for display by the client application 102. As another example, the resource transition server 108 may be configured to receive authorization inputs from the client application 102 in response to user interaction with the displayed second user interfaces, generate seamless transition instructions based on the received authorization inputs, and provide the generated seamless transition instructions to the group-based communication server 106 for execution by the group-based communication system. While the architecture 100 of FIG. 1 depicts the resource transition server 108 as part of the group-based communication system 105, a person of ordinary skill in the art will recognize that the resource transition server may be part of another computer system, such as part of the external communication system 111 or part of a resource transition computer system that is separate from but in communication with both the group-based communication system and the external communication system 111. In some embodiments, the functions performed by the resource transition server 108 may be performed by computing entities residing on two or more computing systems. In some embodiments, when the external communication system 111 is, for example, a Gmail® communication system, at least part of the functions performed by the resource transition server 108 may be performed by a computing entity residing on the external communication system 111 (e.g., as part of the Gmail® server system). In some embodiments, when the external communication system 111 is, for example, a Gmail® communication system, at least part of the functions performed by the resource transition server 108 may be performed by a computing entity residing on at least one of the group-based communication system 105 and a resource transition computer system that is separate from but in communication with both the group-based communication system and the external communication system 111. In some embodiments, the functions performed by the resource transition server 108 are performed by the group-based communication server 106, and thus the client-side transition agent 115 may communicate directly with the group-based communication server 106.

The external communication system 111 may be configured to provide various functionalities related to external communication resources to at least one of the external communication system API 103 and the resource transition server 108. For example, the external communication system 111 may be configured to provide external communication resources to the external communication system API 103 and external parameter values to the resource transition server 108. Examples of external communication systems include the Gmail® communication system, the Yahoo! Mail® communication system, the Whatsapp® communication system, the Facebook® communication system, etc.

The external communication server 112 may be embodied as a computer or computers as known in the art. An example architecture for the external communication server 112 is depicted in the apparatus 500 of FIG. 5. The external communication server 112 may be configured to provide external communication resources to the external communication system API 103, e.g., in response to one or more API calls by the external communication system API 103 and in accordance with an access privilege mode of an external user profile of the client computing device 101. Furthermore, the external communication server 112 may be configured to provide external parameter values for particular external communication systems to the resource transition server 108, e.g., in accordance with an access privilege mode of an external user profile of the client computing device 101, an access privilege mode of the resource transition server 108, and/or an access privilege mode of the group-based communication system 105. Moreover, the external communication server 112 may be configured to retrieve at least one of external communication resources and/or external parameter values from the external communication repository 113, e.g., for transmission to at least one of the external communication system API 103 and the resource transition server 108.

The external communication repository 113 may be embodied as a data storage device such as a Network Attached Storage (NAS) device or devices, or as a separate database server or servers. The external communication repository 113 may be configured to store electronic data accessed and stored by the external communication server 112 to facilitate the operations of the external communication server 112. For example, the external communication repository 113 may include electronic data related to external communication resources associated with the external communication system 111, such as data related to external parameter values associated with the group-based communication system 105. As another example, the external communication repository 113 may include electronic data related to external user accounts associated with the external communication system 111, such access privilege modes for the external user accounts.

An example architecture for the group-based communication server 106 is depicted in the apparatus 200 of FIG. 2. As depicted in FIG. 2, the apparatus 200 comprises processor 202, memory 204, input/output circuitry 206, communications circuitry 208, and group-based communication circuitry 210. Although these components 202-210 are described with respect to functional limitations, it should be understood that the particular implementations necessarily include the use of particular hardware. It should also be understood that certain of these components 202-210 may include similar or common hardware. For example, two sets of circuitries may both leverage use of the same processor, network interface, storage medium, or the like to perform their associated functions, such that duplicate hardware is not required for each set of circuitries.

In one embodiment, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present disclosure.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure the processor 202 to perform the algorithms and/or operations described herein when the instructions are executed.

As just one example, the processor 202 may be configured to maintain one or more communication channels connecting a plurality of client computing device 101 to enable message sharing/dissemination therebetween. The processor 202 ensures that messages intended for exchange between the client computing device 101 within the particular communication channel are properly disseminated to those client computing device 101 for display within respective display windows provided via the client computing device 101.

Moreover, the processor 202 may be configured to synchronize messages exchanged on a particular communication channel with a database for storage and/or indexing of messages therein. In certain embodiments, the processor 202 may provide stored and/or indexed messages to the interface computing entity for dissemination to client computing device 101.

In one embodiment, the apparatus 200 may include input/output circuitry 206 that may, in turn, be in communication with processor 202 to provide output to the user and, in one embodiment, to receive an indication of a user input. The input/output circuitry 206 may comprise a user interface and may include a display, and may comprise a web user interface, a mobile application, a client device, a kiosk, or the like. In one embodiment, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network.

For example, the communications circuitry 208 may include one or more network interface cards, antennae, buses, switches, routers, modems, and supporting hardware and/or software, or any other device suitable for enabling communications via a network. Additionally or alternatively, the communications circuitry 208 may include the circuitry for interacting with the antenna/antennae to cause transmission of signals via the antenna/antennae or to handle receipt of signals received via the antenna/antennae.

Group-based communication circuitry 210 comprises hardware configured to execute operations in response to requests by client computing device 101 when such requests require retrieval and/or modification of data stored in the group-based communication repository 107 and related to group-based communication resources. For example, the group-based communication circuitry 210 may process a request to create a group-based communication interface. The group-based communication circuitry 210 may utilize processing circuitry, such as the processor 202, to perform these actions. However, it should also be appreciated that, In one embodiment, the group-based communication circuitry 210 may include a separate processor, specially configured Field Programmable Gate Array (FPGA), or Application Specific Integrated Circuit (ASIC) for performing the functions described herein. The group-based communication circuitry 210 may be implemented using hardware components of the apparatus configured by either hardware or software for implementing these planned functions.

It is also noted that all or some of the information discussed herein can be based on data that is received, generated and/or maintained by one or more components of apparatus 200. In one embodiment, one or more external systems (such as a remote cloud computing and/or data storage system) may also be leveraged to provide at least some of the functionality discussed herein.

An example architecture for a client computing device 101 is depicted in the apparatus 300 of FIG. 3. As depicted in FIG. 3, the apparatus 300 comprises processor 301, memory 303, input/output circuitry 305, and communications circuitry 307. Although these components 301-307 are described with respect to functional limitations, it should be understood that the particular implementations necessarily include the use of particular hardware. It should also be understood that certain of these components 301-307 may include similar or common hardware. For example, two sets of circuitries may both leverage use of the same processor, network interface, storage medium, or the like to perform their associated functions, such that duplicate hardware is not required for each set of circuitries.

In one embodiment, the processor 301 (and/or co-processor or any other processing circuitry assisting or otherwise associated with the processor) may be in communication with the memory 303 via a bus for passing information among components of the apparatus. The memory 303 is non-transitory and may include, for example, one or more volatile and/or non-volatile memories. In other words, for example, the memory 303 may be an electronic storage device (e.g., a computer-readable storage medium). The memory 303 may be configured to store information, data, content, applications, instructions, or the like for enabling the apparatus 300 to carry out various functions in accordance with example embodiments of the present disclosure. For example, the memory 303 may be configured to cache messages exchanged on one or more group-based communication channels, such that the processor 301 may provide various messages to client devices (e.g., on an as needed or as requested basis).

The processor 301 may be embodied in a number of different ways and may, for example, include one or more processing devices configured to perform independently. In some preferred and non-limiting embodiments, the processor 301 may include one or more processors configured in tandem via a bus to enable independent execution of instructions, pipelining, and/or multithreading.

In some preferred and non-limiting embodiments, the processor 301 may be configured to execute instructions stored in the memory 303 or otherwise accessible to the processor 301. In some preferred and non-limiting embodiments, the processor 301 may be configured to execute hard-coded functionalities. As such, whether configured by hardware or software methods, or by a combination thereof, the processor 301 may represent an entity (e.g., physically embodied in circuitry) capable of performing operations according to an embodiment of the present disclosure while configured accordingly. Alternatively, as another example, when the processor 301 is embodied as an executor of software instructions, the instructions may specifically configure the processor 301 to perform the algorithms and/or operations described herein when the instructions are executed.

In one embodiment, the apparatus 300 may include input/output circuitry 305 that may, in turn, be in communication with processor 301 to provide output to the user and, In one embodiment, to receive an indication of a user input. The input/output circuitry 305 may comprise a user interface and may include a display, and may comprise a web user interface, a mobile application, a client device, a kiosk, or the like. In one embodiment, the input/output circuitry 305 may also include a keyboard, a mouse, a joystick, a touch screen, touch areas, soft keys, a microphone, a speaker, or other input/output mechanisms.

The communications circuitry 307 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 307 may include, for example, a network interface for enabling communications with a wired or wireless communication network. For example, the communications circuitry 307 may include one or more network interface cards, antennae, buses, switches, routers, modems, and supporting hardware and/or software, or any other device suitable for enabling communications via a network. Additionally or alternatively, the communications circuitry 307 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 300. In one embodiment, one or more external systems (such as a remote cloud computing and/or data storage system) may also be leveraged to provide at least some of the functionality discussed herein.

An example architecture for the resource transition server 108 is depicted in the apparatus 400 of FIG. 4. As depicted in FIG. 4, the apparatus 400 comprises processor 402, memory 404, input/output circuitry 406, communications circuitry 408, and resource transition circuitry 410. Although these components 402-410 are described with respect to functional limitations, it should be understood that the particular implementations necessarily include the use of particular hardware. It should also be understood that certain of these components 402-410 may include similar or common hardware. For example, two sets of circuitries may both leverage use of the same processor, network interface, storage medium, or the like to perform their associated functions, such that duplicate hardware is not required for each set of circuitries.

In one embodiment, the processor 402 (and/or co-processor or any other processing circuitry assisting or otherwise associated with the processor) may be in communication with the memory 404 via a bus for passing information among components of the apparatus. The memory 404 is non-transitory and may include, for example, one or more volatile and/or non-volatile memories. In other words, for example, the memory 404 may be an electronic storage device (e.g., a computer-readable storage medium). The memory 404 may be configured to store information, data, content, applications, instructions, or the like for enabling the apparatus to carry out various functions in accordance with example embodiments of the present disclosure.

The processor 402 may be embodied in a number of different ways and may, for example, include one or more processing devices configured to perform independently. In some preferred and non-limiting embodiments, the processor 402 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 402 may be configured to execute instructions stored in the memory 404 or otherwise accessible to the processor 402. In some preferred and non-limiting embodiments, the processor 402 may be configured to execute hard-coded functionalities. As such, whether configured by hardware or software methods, or by a combination thereof, the processor 402 may represent an entity (e.g., physically embodied in circuitry) capable of performing operations according to an embodiment of the present disclosure while configured accordingly. Alternatively, as another example, when the processor 402 is embodied as an executor of software instructions, the instructions may specifically configure the processor 402 to perform the algorithms and/or operations described herein when the instructions are executed.

As just one example, the processor 402 may be configured to maintain one or more communication channels connecting a plurality of client computing device 101 to enable message sharing/dissemination therebetween. The processor 402 ensures that messages intended for exchange between the client computing device 101 within the particular communication channel are properly disseminated to those client computing device 101 for display within respective display windows provided via the client computing device 101.

Moreover, the processor 402 may be configured to synchronize messages exchanged on a particular communication channel with a database for storage and/or indexing of messages therein. In certain embodiments, the processor 402 may provide stored and/or indexed messages to the interface computing entity for dissemination to client computing device 101.

In one embodiment, the apparatus 400 may include input/output circuitry 406 that may, in turn, be in communication with processor 402 to provide output to the user and, in one embodiment, to receive an indication of a user input. The input/output circuitry 406 may comprise a user interface and may include a display, and may comprise a web user interface, a mobile application, a client device, a kiosk, or the like. In one embodiment, the input/output circuitry 406 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 404, and/or the like).

The communications circuitry 408 may be any means such as a device or circuitry embodied in either hardware or a combination of hardware and software that is configured to receive and/or transmit data from/to a network and/or any other device, circuitry, or module in communication with the apparatus 400. In this regard, the communications circuitry 408 may include, for example, a network interface for enabling communications with a wired or wireless communication network.

For example, the communications circuitry 408 may include one or more network interface cards, antennae, buses, switches, routers, modems, and supporting hardware and/or software, or any other device suitable for enabling communications via a network. Additionally or alternatively, the communications circuitry 408 may include the circuitry for interacting with the antenna/antennae to cause transmission of signals via the antenna/antennae or to handle receipt of signals received via the antenna/antennae.

Resource transition circuitry 410 comprises hardware configured to execute operations in response to requests by client computing devices 101 when such requests require generating recommended transition profiles, generating seamless transition instructions, performing communication resource transitions, and/or performing seamless communication resource transitions. For example, the resource transition circuitry 410 may perform a seamless transition request. The resource transition circuitry 410 may utilize processing circuitry, such as the processor 402, to perform these actions. However, it should also be appreciated that, In one embodiment, the resource transition circuitry 410 may include a separate processor, specially configured Field Programmable Gate Array (FPGA), or Application Specific Integrated Circuit (ASIC) for performing the functions described herein. The resource transition circuitry 410 may be implemented using hardware components of the apparatus configured by either hardware or software for implementing these planned functions.

It is also noted that all or some of the information discussed herein can be based on data that is received, generated and/or maintained by one or more components of apparatus 400. In one embodiment, one or more external systems (such as a remote cloud computing and/or data storage system) may also be leveraged to provide at least some of the functionality discussed herein.

An example architecture for the external communication server 112 is depicted in the apparatus 500 of FIG. 5. As depicted in FIG. 5, the apparatus 500 comprises processor 502, memory 504, input/output circuitry 506, communications circuitry 508, and external communication circuitry 510. Although these components 502-510 are described with respect to functional limitations, it should be understood that the particular implementations necessarily include the use of particular hardware. It should also be understood that certain of these components 502-510 may include similar or common hardware. For example, two sets of circuitries may both leverage use of the same processor, network interface, storage medium, or the like to perform their associated functions, such that duplicate hardware is not required for each set of circuitries.

In one embodiment, the processor 502 (and/or co-processor or any other processing circuitry assisting or otherwise associated with the processor) may be in communication with the memory 504 via a bus for passing information among components of the apparatus. The memory 504 is non-transitory and may include, for example, one or more volatile and/or non-volatile memories. In other words, for example, the memory 504 may be an electronic storage device (e.g., a computer-readable storage medium). The memory 504 may be configured to store information, data, content, applications, instructions, or the like for enabling the apparatus to carry out various functions in accordance with example embodiments of the present disclosure.

The processor 502 may be embodied in a number of different ways and may, for example, include one or more processing devices configured to perform independently. In some preferred and non-limiting embodiments, the processor 502 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 502 may be configured to execute instructions stored in the memory 504 or otherwise accessible to the processor 502. In some preferred and non-limiting embodiments, the processor 502 may be configured to execute hard-coded functionalities. As such, whether configured by hardware or software methods, or by a combination thereof, the processor 502 may represent an entity (e.g., physically embodied in circuitry) capable of performing operations according to an embodiment of the present disclosure while configured accordingly. Alternatively, as another example, when the processor 502 is embodied as an executor of software instructions, the instructions may specifically configure the processor 502 to perform the algorithms and/or operations described herein when the instructions are executed.

As just one example, the processor 502 may be configured to maintain one or more communication channels connecting a plurality of client computing device 101 to enable message sharing/dissemination therebetween. The processor 502 ensures that messages intended for exchange between the client computing device 101 within the particular communication channel are properly disseminated to those client computing device 101 for display within respective display windows provided via the client computing device 101.

Moreover, the processor 502 may be configured to synchronize messages exchanged on a particular communication channel with a database for storage and/or indexing of messages therein. In certain embodiments, the processor 502 may provide stored and/or indexed messages to the interface computing entity for dissemination to client computing device 101.

In one embodiment, the apparatus 500 may include input/output circuitry 506 that may, in turn, be in communication with processor 502 to provide output to the user and, in one embodiment, to receive an indication of a user input. The input/output circuitry 506 may comprise a user interface and may include a display, and may comprise a web user interface, a mobile application, a client device, a kiosk, or the like. In one embodiment, the input/output circuitry 506 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 504, and/or the like).

The communications circuitry 508 may be any means such as a device or circuitry embodied in either hardware or a combination of hardware and software that is configured to receive and/or transmit data from/to a network and/or any other device, circuitry, or module in communication with the apparatus 500. In this regard, the communications circuitry 508 may include, for example, a network interface for enabling communications with a wired or wireless communication network.

For example, the communications circuitry 508 may include one or more network interface cards, antennae, buses, switches, routers, modems, and supporting hardware and/or software, or any other device suitable for enabling communications via a network. Additionally or alternatively, the communications circuitry 508 may include the circuitry for interacting with the antenna/antennae to cause transmission of signals via the antenna/antennae or to handle receipt of signals received via the antenna/antennae.

External communication circuitry 510 comprises hardware configured to execute operations in response to requests by client computing devices 101 and/or by resource transition servers 108 when such requests require retrieval and/or modification of data stored in the external communication repository 113. For example, the external communication circuitry 510 may process a request to retrieve an external communication resource and/or an external parameter value for an external communication resource. The external communication circuitry 510 may utilize processing circuitry, such as the processor 502, to perform these actions. However, it should also be appreciated that, In one embodiment, external communication circuitry 510 may include a separate processor, specially configured Field Programmable Gate Array (FPGA), or Application Specific Integrated Circuit (ASIC) for performing the functions described herein. The external communication circuitry 510 may be implemented using hardware components of the apparatus configured by either hardware or software for implementing these planned functions.

It is also noted that all or some of the information discussed herein can be based on data that is received, generated and/or maintained by one or more components of apparatus 500. In one embodiment, one or more external systems (such as a remote cloud computing and/or data storage system) may also be leveraged to provide at least some of the functionality discussed herein.

As will be appreciated, any such computer program instructions and/or other type of code may be loaded onto a computer, processor or other programmable apparatus's circuitry to produce a machine, such that the computer, processor or other programmable circuitry that execute the code on the machine creates the means for implementing various functions, including those described herein.

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Moreover, although not shown, various embodiments of a group-based communication platform may comprise one or more databases configured for storing and/or indexing messages exchanged within various group-based communication channels.

Example Data Flows of Embodiments of the Present Disclosure

Various embodiments of the present disclosure relate generally to seamless communication resource transition between external communication systems. More specifically, various embodiments of the present disclosure are related to a resource transition server that performs seamless communication resource transition using at least one of recommended transitional profiles, retrospective recipient predictions, prospective recipient predictions, and/or client-side transition agents. Through using such techniques, various embodiments of the present disclosure enable substantial improvements in efficiency and user-friendliness of communication resource transitions, especially communication resources transitions that involve group-based communication systems.

Seamless Communication Resource Transition

FIG. 6 is a flow diagram of an example process 600 for performing seamless communication resource transition in accordance with one embodiment of the present disclosure. The process 600 illustrated in FIG. 6 is described herein with reference to a resource transition server, such as the group-based communication server 106 of FIG. 1, but can be performed by any system of one or more computers, such as a system that comprises the group-based communication server 106 of FIG. 1. Each block of the flowchart, and combinations of blocks in the flowchart, may be implemented by various means such as hardware, firmware, circuitry and/or other devices associated with execution of software including one or more computer program instructions. For example, one or more of the procedures described in FIG. 6 may be embodied by computer program instructions, which may be stored by a non-transitory memory of an apparatus employing an embodiment of the present disclosure and executed by a processor in the apparatus. These computer program instructions may direct a computer or other programmable apparatus to function in a particular manner, such that the instructions stored in the computer-readable storage memory produce an article of manufacture, the execution of which implements the function specified in the flowchart block(s).

The process 600 begins at step 602 with receiving, by the resource transition server 108 and from a client computing device (e.g., the client computing device 101 of FIG. 1), an interface display indication representative of a first user interface. In some embodiments, the interface display indication is configured to indicate that the client computing device 101 is displaying the first user interface. The first user interface may be rendered for display on the client computing device 101 and may provide an external communication resource visual representation associated with an external communication resource of an external communication system (e.g., the external communication system 111 of FIG. 1). In some embodiments, the external communication resource visual representation may include at least one component of one or more components of an external communication resource associated with the first user interface.

An example first user interface is presented in the user interface 700 of FIGS. 7A-7B, which comprises an external communication resource visual representation 701 that comprises various components of an external communication resource, which in this example is an email communication resource. In particular, the example email communication resource associated with the external communication resource visual representation 701 in the user interface 700 comprises at least the following components: a subject line component (corresponding to user interface element 704), a sender identifier component (corresponding to user interface element 705), a receiver identifier component (corresponding to user interface element 706), and a timestamp component (corresponding to user interface element 707).

In addition to the external communication resource visual representation 701, the user interface 700 of FIGS. 7A-7B further comprises a cursor user interface element 702 and an agent invocation user interface element 703. In some embodiments, user interaction with the cursor user interface element 702 can modify a virtual location within the user interface 700 that a user can select. In some embodiments, user selection of the agent invocation user interface element 703 represents a user desire to begin a communication resource transition involving the external communication resource associated with the external communication resource visual representation 701 and/or a user desire to invoke a client-side transition agent being executed on the client computing device 101 (e.g., client-side transition agent 115 being executed on the client computing device 101 FIG. 1). In some embodiments, the interface display indication is configured to represent that a client-side transition agent 115 is being executed on the client computing device 101 but has not been invoked by the user of the client computing device. In some embodiments, the interface display indication is at least a part of an HTTP command, e.g., a part of a payload of an HTTP command.

At step 604, the resource transition server 108 receives, from the client computing device 101, a seamless transition request for providing the seamless transaction. In some embodiments, the seamless transaction request and the interface display indication are part of the same data packet and/or the same data structure (e.g., the same HTTP command) transmitted by the client computing device to the resource transition server 108, where the data packet comprises an indication of the external communication resource associated with the first user interface. In some embodiments, the seamless transition request comprises an indication of an external communication resource. In some embodiments, the resource transition agent 108 is configured to generate a seamless transition request by periodically retrieving latest external communication resources pertaining to a group-based user for the group-based communication system 105 from the external communication system 111.

In some embodiments, the seamless transition request is generated by the client-side transition agent 115 of the client computing device 101 in response to a user interaction with the first user interface configured to represent a user desire to begin a communication resource transition involving the external communication resource associated with the first user interface. In some of those embodiments, the client-side transition agent 115 may infer the user desire to begin the communication resource transition based on user selection of a user interface element associated with the client-side transition agent 115 in the first user interface. For example, as depicted in FIG. 7B, the client-side transition agent 115 may infer the user desire to begin the communication resource transition based on user selection of the agent invocation user interface element 703 in the user interface 700 of FIGS. 7A-7B. In some embodiments, after inferring the user desire to begin the communication resource transition, the client-side transition agent 115 generates a seamless transition request and transmits the seamless transmission request to the resource transition server 108.

At step 606, in response to receiving the seamless transition request, the resource transition server 108 transmits to the client computing device 101 a second user interface rendered for display by the client computing device 101 in conjunction with the first user interface. In some embodiments, the second user interface depicts a recommended transitional profile visual representation associated with a recommended transitional profile determined by a transitional profile recommendation routine. In some embodiments, the recommended transitional profile visual representation comprises data associated with at least one group-based recommended value for the recommended transitional profile, where the at least one group-based recommended value may include at least one interface identifier recommended value and/or at least one channel identifier recommended value. Determining recommended transitional profiles is determined in greater detail below with reference to FIGS. 13-14.

An example second user interface is depicted in the user interface 800 of FIG. 8. The user interface 800 of FIG. 8 comprises an external communication resource visual representation 801 and a recommended transitional profile visual representation 802, where the recommended transitional profile visual representation 802 appears in a side-by-side arrangement with the external communication resource visual representation 801. The recommended transitional profile visual representation 802 comprises transition input user interface elements 821-823 and an authorization input user interface element 825. Each transition input user interface element 821-823 in the example user interface 800 is associated with a group-based parameter for the external communication resource for the user interface 800 (i.e., the external communication resource depicted using the external communication resource visual representation 801).

A transition input user interface element 821-823 may enable the user to input a selected value for a group-based parameter associated with the transition input user interface element and may have a default value, which may be the value assigned to the transition input user interface element 822 prior to user input. In some embodiments, the default value for each transition input user interface element 821-823 for an external communication resource may be determined based on a group-based recommended value for a particular group-based parameter that is associated with the transition input user interface in the recommended transitional profile for the external communication resource.

In the example user interface 800 of FIG. 8., the recommended transitional profile visual representation 802 associated with the external communication interface comprises the following user interface elements: (i) a transition input user interface element 821 associated with a custom comment group-based parameter (which may, for example, relate to a content group-based parameter of a group-based communication resource) with a default value of null; (ii) a transition input user interface element 822 associated with a channel identification group-based parameter with a default value 826 indicating a group-based communication channel with the identifier #general; and (iii) a transition input user interface element 823 associated with a group-based attachment parameter with a default value indicating lack of a preference for attachment inclusion in a group-based communication resource that comprises an indication of the external communication resource.

In some embodiments, when an external communication resource has no attachments and/or has no attachments deemed substantively significant and/or non-duplicative, the default value for an attachment group-based parameter of the external communication resource is set to a value indicating a preference for lack of attachment inclusion in a group-based communication resource that comprises an indication of the external communication resource. In some embodiments, when an external communication resource has one or more attachments and/or has one or more attachments deemed substantively significant and/or non-duplicative, the default value for the attachment group-based parameter of the external communication resource is set to a value indicating a preference for attachment inclusion. In some embodiments, a recommended transitional profile visual representation is configured to display non-null default values for particular group-based parameters (e.g., interface identification parameter values and/or channel identification parameter values). In some embodiments, if the external parameter value for an attachment external parameter for an external communication resource indicates presence of attachments, the only possible selected value for an attachment group-based parameter for the external communication resource indicates inclusion of attachments in a group-based communication resource corresponding to the external communication resource (e.g., if the external communication resource has one or more attachments, those attachments must be included in a group-based communication resource that comprises an indication of the external communication resource).

A further example of a second user interface is depicted in the user interface 900 of FIG. 9, which depicts a recommended transitional profile visual representation 902 that appears in an overlay arrangement with an external communication resource visual representation 901. The recommended transitional profile visual representation 902 comprises transition input user interface elements 922-926 and an authorization input user interface element 928. The transition input user interface elements 922-926 include: (i) a transition input user interface element 922 related to a content group-based parameter with a default value that comprises the default value portion 932 and a null default value associated with the contents of the transition input user interface element 922; (ii) a transition input user interface element 923 related to an interface identification parameter with a default value associated with the group-based communication interface having the identifier "WSI"; (iii) a transition input user interface element 924 related to a channel identification parameter with a default value associated with the group-based communication interface having the identifier "#design"; (iv) an attachment user interface element 925 related to a group-based attachment parameter with a default value indicating a preference for attachment inclusion; and (v) an email notification group-based parameter 926 with a default value indicating a preference for lack of email notifications.

In some embodiments, the default value for a transition input user interface element may include an immutable default value portion (e.g., may be partially or fully immutable). An immutable default value portion is a portion of a default value for a transition input user interface element that cannot be modified through user interaction with the transition input user interface. The default value portion 932 for the transition input user interface element 922 is an example of an immutable default value portion, as contents of the default value portion cannot be modified through user interaction with the transition input user interface.

At step 608, the resource transition server 108 receives, from the client computing device 101, an authorization input associated with the recommended transitional profile visual representation. The authorization input may be generated by the client computing device 101 based on user interaction with the displayed second user interface, for example in response to user interaction with a user interface element (e.g., an authorization input user interface element) of the recommended transitional profile visual representation of the second user interface. The authorization input may indicate a user approval, rejection, and/or partial approval of a communication resource transition in accordance with the recommended group-based values defined by a recommended transitional profile that is associated with the second user interface, e.g., that is associated with a recommended transitional profile visual representation of the second user interface.

In some embodiments, the authorization input for a recommended transitional profile visual representation comprises a selected user value for at least some (e.g., all) of one or more group-based parameters for an external communication resource that is associated with the second user interface. For example, in the example user interface 1000 of FIG. 10 that comprises a recommended transitional profile visual representation 1002 displayed in a side-by-side arrangement with an external communication resource visual representation 1001, an authorization input generated based on user selection of an authorization input user interface element 1024 comprises the value "With attachments" for the group-based parameter associated with the transition input user interface element 1021, the value "#test email" for the group-based parameter associated with the transition input user interface element 1022, and the value indicating a preference for attachment inclusion for the group-based parameter associated with the transition input user interface element 1023.

At step 610, the resource transition server 108 generates a seamless communication resource transition involving the external communication resource between the group-based communication system and the external communication system. In some embodiments, the resource transition server 108 generates one or more seamless transition instructions for the seamless communication and transmits the seamless transition instructions to a group-based communication server (e.g., the group-based communication server 106 of FIG. 1). The one or more seamless transition instructions for a communication resource transition may include data for a group-based communication resource that comprises an indication of the external communication resource. In some embodiments, generating the seamless transition comprises determining that a third user interface (displayed on a computing device, such as the client computing device 101) displays at least one group-based communication interface and/or at least one group-based communication channel that is affected by the seamless transition and updating the third user interface to retrieve latest group-based communication resources configured to be displayed by the group-based communication system.

The example user interfaces 1100-1200 of FIGS. 11-12 depict group-based communication resources generated and transmitted through seamless communication resource transition. User interface 1100 of FIG. 11 depicts a group-based communication resource 1101 with a heading component 1131 (e.g., determined based on a heading group-based parameter) and a body component 1132 (e.g., determined based on a content group-based parameter) in a #test-email group-based communication channel 1121 (e.g., determined based on a channel identification parameter) and a tinyspeck group-based communication interface 1111 (e.g., determined based on an interface identification parameter). User interface 1200 of FIG. 12 also depicts a group-based communication resource 1201 in a #test-email group-based communication channel 1221 (e.g., determined based on a channel identification parameter) and a tinyspeck group-based communication interface 1211 (e.g., determined based on an interface identification parameter). The group-based communication resource 1201 of FIG. 12 has a heading component 1213 (e.g., determined based on a heading group-based parameter), a body component 1214 (e.g., determined based on a content group-based parameter), and an attachment component 1215 (e.g., determined based on an attachment group-based parameter).

The seamless transition instructions may be operated by any computing entity which communicates with a group-based communication system (e.g., the group-based communication system 105 of FIG. 1). In some embodiments, the seamless transition instructions are generated by a client computing device (e.g., through a client-side resource transition agent, such as the client-side transition agent 115 operating on the client computing device 101 of FIG. 1). In some embodiments, the seamless transition instructions are transmitted by a resource transition server (e.g., resource transition server 108 of FIG. 1). In some embodiments, the seamless transition instructions include data defined based on protocols of a remote procedure call system, such as the Google® Remote Procedure Call (gPRC) system. In some embodiments, seamless transition instructions for a seamless communication resource transition may include data having the below transition class structure (e.g., used for establishing connection with a group-based communication server, such as the group-based communication server 106 of FIG. 1):

```
message Account {
    string id;
    int64 version;
    string group_acct_id;
    string external_acct_id;
    string content;
    AccountType type;
    string time_zone;
    int64 date_created;
    OAuthToken oauth;
}
```

In the above-noted transition class structure, the id field may refer to an identifier of the seamless communication resource transition, the version field may refer to a type of seamless communication resource transition, the group_acct_id field may refer to an identifier of a user account requesting the seamless communication resource transition in the group-based communication system 105 (e.g., a Slack® identifier); the external_acct_id field may refer to an identifier of a user account requesting the seamless communication resource transition in the external communication system 111 (e.g., an email address); the type field may refer to a type of the external communication system 111 (e.g., Gmail® or Microsoft® Outlook®); the content field may refer to contents of the external communication resource (e.g., email content); the time_zone field may refer to a time zone of a timestamp associated with the data structure; the date_created may refer to the timestamp associated with the transition class structure, and oauth may include user authentication information associated with the data structure, where the user authentication information may be configured to permit a user account requesting the seamless communication resource transition to access at least one of a resource transition server residing on a group-based communication system (e.g., on a Slack® server, for example in embodiments that provide communication resource transition capabilities for Outlook®) and a resource transition server residing on an external communication system (e.g., on an email server, for example in embodiments that provide communication resource transition capabilities for Gmail®).

In some embodiments, value of the oauth field may be an instance of a class defined by the below authentication class structure:

```
Message OAuth Token {
    string client_id;
    string refresh_token;
    string access_token;
    int64 date_expire;
    string token_type;
    repeated string scope;
    int date_created;
    int date_updated;
    bool is_invalid;
}
```

In the above-noted authentication class structure, the client id field may refer to an identifier of a group-based user account seeking to access (e.g., retrieve and/or modify) data associated with the group-based communication system 105; the access_token field may refer to a token whose value indicates eligibility to access data associated with the group-based communication system 105 or lack thereof; the refresh token field may refer to a token for obtaining a new access_token after expiration of an access_token; the date_expire field may refer to an expiration date for the authentication class structure; the token type may refer to a type of the access_token (e.g., an administrator access_token); the scope field may refer to one or more group-based interfaces associated with the user account having the client-id; the date_created field may refer to a creation date of the authentication class structure; the date_updated field may refer to a last update date of the authentication class structure; and the is_invalid field may denote success of authentication using the authentication class structure.

Determining Recommended Transitional Profiles

Each component of a group-based communication resource that is generated as part of a seamless communication resource transition may be determined based on an authorization input, where the authorization input may characterize values for one or more group-based parameters for an external communication resource. To determine default values and/or recommended values for the one or more group-based parameters for the external communication resource, the resource transition server 108 may use external parameter values for the external communication resource to determine a recommended transitional profile for the external communication resource.

FIG. 13 is a flow diagram of an example process for determining a recommended transitional profile for an external communication resource in accordance with one embodiment of the present disclosure. The process 1300 illustrated in FIG. 1300 is described herein with reference to a resource transition server, such as the group-based communication server 106 of FIG. 1, but can be performed by any system of one or more computers, such as a system that comprises the group-based communication server 106 of FIG. 1. Each block of the flowchart, and combinations of blocks in the flowchart, may be implemented by various means such as hardware, firmware, circuitry and/or other devices associated with execution of software including one or more computer program instructions. For example, one or more of the procedures described in FIG. 13 may be embodied by computer program instructions, which may be stored by a non-transitory memory of an apparatus employing an embodiment of the present disclosure and executed by a processor in the apparatus. These computer program instructions may direct a computer or other programmable apparatus to function in a particular manner, such that the instructions stored in the computer-readable storage memory produce an article of manufacture, the execution of which implements the function specified in the flowchart block(s).

Process 1300 begins at step 1302 with identifying, by the resource transition server 108, one or more external parameter values for the external communication resource. For example, the resource transition server 108 may retrieve, from a group-based communication server (e.g., the group-based communication server 106 of FIG. 1) external parameter values for the external communication resource. The external communication resource may be a communication resource associated with a seamless transition request received from a client computing device (e.g., the client computing device of FIG. 1). In some embodiments, the resource transition server 108 makes one or more API calls (e.g., one or more calls to a remote procedure call system, such as the gPRC system) to the group-based communication server to retrieve external parameter values for the external communication resource. In some embodiments, the one or more external parameter values comprise one or more contextual external parameter values and one or more content-based parameter values.

In some embodiments, receiving the external communication resource comprises accessing a first external database associated with the external communication system. In some of those embodiments, accessing the first external database comprises accessing the first external database using a first access privilege mode, wherein the first access privilege mode is associated with the group-based communication system 105. For example, the first access privilege mode may enable the resource transition server 108 to have administrator access privileges and/or have access to a wider range of data related to the external communication system 111 (e.g., external parameter values) than an access mode defined for an external user account associated with the external communication system. In some embodiments, accessing the first external database comprises accessing the first external database using a second access privilege mode, wherein the second access privilege mode is associated with a first external user account (e.g., the external user account associated with the client computing device 101 from which we obtained a seamless transition request).

At step 1304, the resource transition server 108 identifies one or more group-based parameters for the external communication resource. In some embodiments, identifying the one or more group-based parameters comprises determining an external communication type associated with the external communication resource, wherein the external communication type defines a property of a real-world organizational function associated with the external communication resource; and determining the one or more group-based parameters based on the communication type. For example, the resource transition server 108 may identify that an email external communication resource having an email external communication type has different group-based parameters than a calendar-invite external communication resource having an calendar-invite external communication type.

For example, at least some group-based parameters for an email communication resource may relate to the defined data fields of the below email class structure:

```
message EmailMessage {
    string id;
    string subject;
    repeated EmailAddress from;
    repeated EmailAddress to;
    repeated Email Address cc;
    repeated Email Address bcc;
    repeated EmailAddress reply_to;
    EmailAddress sender;
    int64 date_sent;
    int64 date_received;
    int32 size;
    string rfc822_message_id;
    repeated string reference;
    string snippet;
    string body_preview;
    string body;
    repeated Attachment;
}
```

In the above-noted email-based class structure, the id field may refer to an identifier of an email; the subject field may refer to the subject of an email; the from field may include identifiers for email originators; the to field may include identifiers for email recipients; the cc field may include identifiers for those carbon copied on the email; the bee field may include identifiers for those blind-carbon-copied on the email; the reply_to field may include identifiers for email recipients that may, because of application-level protocols, appear as originators of the email; the sender field may include the identifier for the unique sender of the email; the date sent field may refer to a timestamp associated with sending of an email; the date_received field may refer to a timestamp associated with receipt of an email; the size field may refer to size of an email; the message id_field may refer to message identifier header information associated with the email; the in_reply_to field may refer to any in-reply-to header information associated with the email; the reference field may refer to any reference header information associated with the email; the snippet field may refer to online plain-text associated with the email (e.g., used for n-line rendering); the body_preview field may refer to data associated with a marked-down version of the email (e.g., used for rendering the email in a Slack® environment); the body field may refer to the full-screen rendering of the email (e.g., the HTML data associated with the email); and the attachment field may include data (e.g., identifying data and/or file type data) for one or more attachments associated with the email.

As another example, at least some group-based parameters for a calendar invite communication resource may relate to the data fields of the below calendar-invite class structure:

```
message Event {
    string id;
    int64 version;
    string remote_id;
    string calendar_id;
    string uid;
    string title;
    string description;
    string location;
    CalendarEventStatus status;
    DateTime start;
    DateTime end;
    Recurrence;
    Organizer organizer;
    Repeated Attendee;
    Repeated Alarm;
```

```
    int64 date_created;
    int64 date_updated;
    RSVP;
    bool is_private;
    bool is_read_only;
    CalendarFreeBusy Status free_busy;
}
```

In the above-noted calendar-invite class structure, the id field may refer to an identifier for the calendar invite; the version field may refer to a version and/or type of a calendar communication system; the remote_id field may refer to an identifier of an event associated with the calendar invite in a particular calendar that the calendar invite belongs; the calendar_id may refer to an identifier of the particular calendar that the calendar invite belongs to (e.g., business calendar); the uid field may refer to a universal (e.g., cross-calendar) identifier for the calendar invite; the title field may refer to a title of a calendar event associated with the calendar invite; the description field may refer to a body of a calendar event associated with the calendar invite; the location field may refer to a location of a calendar event associated with the calendar invite; the status field may refer to a status (e.g., cancelled, moved, etc.) of a calendar event associated with the calendar invite; the start field may refer to a start time and date of a calendar event associated with the calendar invite; the end field may refer to an end time and date of a calendar event associated with the calendar invite; the recurrence field may refer to whether an event associated with the calendar invite is recurring; the organizer field may refer to an identifier of the organizer of an event associated with the calendar invite; the attendee field may refer to identifiers of the invited and/or confirmed attendees of an event associated with the calendar invite; the alarm field may refer to whether an alarm has been set for the calendar invite; the date_created field may refer to a creation date for the calendar invite; the date_updated may refer to a latest update date for the calendar invite; the rsvp field may refer to an rsvp status of the calendar invite; the is_private field may refer to whether the calendar invite is private; the is_read_only field may refer to whether the calendar invite is private; the free_busy field may refer to whether a recipient of a calendar is free at a time defined by the start field and the end field.

In some embodiments, the one or more group-based parameters for an external communication resource include a group-based communication type defining a group-based identifier. For example, an email communication resource having an email communication type may have a group-based communication type parameter with a group-based identifier that indicates that the email communication resource has an email-based group-based communication type. As another example, a calendar-invite communication resource having a calendar-invite communication type may have a group-based communication type parameter with a group-based identifier that indicates that the calendar-invite communication resource has a calendar-invite-based group-based communication type. In some embodiments, a group-based communication type for a group-based communication is associated with a particular visual representation layout, e.g., a particular interface rendering of a layout for work objects of various types in the Slack® communication system.

At step 1306, the resource transition server 108 determines a recommended transitional profile for the external communication resource based on the one or more external parameter values for the external communication resource. In some embodiments, the recommended transitional profile comprises one or more group-based recommended values for the external communication resource, each group-based recommended value of the one or more group-based recommended values defining a respective recommended value for a respective variable property of the group-based communication resource.

For example, the recommended transitional profile may include a recommended interface identifier for the external communication resource that may define one or more recommended group-based interfaces for a group-based communication resource that comprises an indication of the external communication resource. As another example, the recommended transitional profile may include a channel identifier recommended value for the external resource system that may define one or more recommended group-based channels for a group-based communication resource that comprises an indication of the external communication resource. As another example, the recommended transitional profile for an external communication resource may include a recommended content group-based parameter value for an external communication resource (e.g., determined based on a content external parameter of the one or more external parameter values for the external communication resource) that may define a recommended body component for a group-based communication resource that comprises an indication of the external communication resource. As a further example, the recommended transitional profile for an external communication resource may include a recommended heading group-based parameter value (e.g., determined based on a heading external parameter of the one or more external parameter values for the external communication resource) that may define a recommended heading component for a group-based communication resource that comprises an indication of the external communication resource. As yet another example, the recommended transitional profile for an external communication resource may include a recommended attachment group-based parameter value (e.g., determined based on an attachment external parameter of the one or more external parameter values for the external communication resource) that may define a recommended attachment component of a group-based communication resource that comprises an indication of the external communication resource.

In some embodiments, determining the recommended transitional profile for an external communication resource comprises determining an interface identifier recommended value for an external communication resource. In some of those embodiments, determining an interface identifier recommended value for an external communication resource may be performed using the various steps of process 1400 of FIG. 14.

Process 1400 begins at step 1402 by determining, using the resource transition server 108 and using a first external parameters values subset, a retrospective recipient prediction for the external communication resource. The retrospective recipient prediction may define one or more first group-based user accounts of a plurality of group-based user accounts associated with the group-based communication system that have a significant past interaction association with those external communication resources that have external parameter values in common with all of the external parameter values of the first subset of the one or more external parameter values. In some embodiments, the first external parameter values subset include the one or more external parameter values subset. In some embodiments, determining the retrospective recipient prediction comprises providing the first external parameter values subset to a retrospective prediction model, wherein the retrospective prediction model is trained using historical data regarding past communication resource transitions associated with the group-based communication system 105. The resource transition server 108 then selects those group-based user accounts whose respective association score is deemed significant, e.g., the top n group-based user accounts and/or the group-based user accounts whose association scores exceeds a threshold association score value.

In some embodiments, to determine the retrospective recipient prediction, the resource transition server 108 analyzes the first external parameter values subset (e.g., the one or more contextual external parameter values) to determine an association value for each group-based user account associated with the group-based communication system 105 that represents a level of past interaction of the group-based user account with other external communication resources deemed sufficiently related to the particular external communication resource. In some embodiments, to determine the retrospective recipient prediction, the resource transition server 108 analyzes the first external parameter values subset (e.g., the one or more contextual external parameter values) to determine an association value for each group-based communication interface associated with the group-based communication system 105 and then determines an association score for each group-based user account based on the association score for each group-based communication interface related to (e.g., including) the group-based user account (e.g., along with, optionally, each activity score denoting a level of interaction of the group-based user account with a group-based communication interface). The resource transition server 108 then selects those group-based user accounts whose respective association score is deemed significant, e.g., the top n group-based user accounts and/or the group-based user accounts whose association scores exceeds a threshold association score value.

At step 1404, the resource transition server 108 determines, based on a second external parameter values subset, a prospective recipient prediction for the external communication resource. The prospective recipient prediction may define one or more second group-based user accounts of the plurality of group-based user accounts estimated to have significant future interest prediction in an inferred subject matter designation of the external communication resource. In some embodiments, the second external parameter values subset comprises the one or more content-based external parameter values. In some embodiments, the inferred subject matter designation for an external communication resource is determined by parsing the external communication resource by a natural language processing model.

In some embodiments, to determine prospective recipient prediction for the external communication resource, the resource transition server 108 determines (e.g., using a natural language processing model) the inferred subject matter designation for the external communication resource. The resource transition server 108 also retrieves subject matter interest designation data associated with each group-based user account of one or more group-based user accounts associated with the group-based communication system 105. The resource transition server 108 then calculates (e.g., using an embedding algorithm) a measure of distance between the inferred subject matter designation for the external communication resource and each subject matter interest designation data associated with a group-based user account and uses the measure of distance associated with each group-based user to determine an association score for each user. The resource transition server 108 then selects those group-based user accounts whose respective association score is deemed significant, e.g., the top n group-based user accounts and/or the group-based user accounts whose association scores exceeds a threshold association score value.

At step 1406, the resource transition server 108 determines, based on the retrospective recipient prediction and the prospective recipient prediction, the interface identifier recommended value for the external communication resource. In some embodiments, the resource transition server 108 uses the retrospective recipient prediction and the prospective recipient prediction to determine a final recipient prediction for the external communication resource (e.g., by combining the two sets of group-based user accounts and/or converting association scores for the two sets into a unified association score and choosing the top n group-based user accounts). The resource transition server 108 then chooses an interface that comprises the most number of group-based user accounts from the final recipient prediction and whose ratio of membership of the group-based user accounts from the final recipient prediction as the interface identifier recommended value.

In some embodiments, determining the recommended transitional profile for an external communication resource for an external communication resource comprises determining a channel identifier recommended value for the external communication resource. In some of those embodiments, to determine a channel identifier recommended value for the external communication resource, the resource transition server 108 retrieves channel subject matter designation data for each group-based communication channel of one or more group-based communication channels associated with the group-based communication system 105 (e.g., one or more group-based communication channels associated with a default group-based communication interface, such as a default group-based communication interface determined using the process 1400 of FIG. 14). The resource transition server 108 then calculates a measure of distance between the inferred subject matter designation for the external communication resource and each channel subject matter designation data for a group-based communication channel of one or more group-based communication channels. The resource transition server 108 then uses each measure of distance to determine one or more recommended channel identifiers, e.g., by selecting the group-based communication interfaces with top n measures of distance and/or by selecting the group-based communication interfaces whose measure of distance exceeds a threshold value.

Additional Implementation Details

Although example processing systems have been described in FIGS. 1-5, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that comprises a back-end component, e.g., as an information/data server, or that comprises a middleware component, e.g., an application server, or that comprises a front-end component, e.g., a client device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as description of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

CONCLUSION

Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

The invention claimed is:

1. A method for transmitting a communication resource between an external communications system to a group-based communication system that is different than the external communications system, comprising:
    causing display of a first sharing user interface element on a first user interface of the external communications system, the first user interface configured to display an email message and the first sharing user interface element being selectable to transmit the email message to the group-based communication system;
    responsive to a first selection of the first sharing user interface element, causing display of a visual representation, on the first user interface, for transmitting the email message to the group-based communication system,
    wherein the visual representation comprises a plurality of settings for configuring display of the email message in the group-based communication system,
    wherein at least one setting of the plurality of settings is determined based in part on the email message,
    wherein at least one further setting of the plurality of settings is set to a recommended value based in part on the email message;
    transmitting, from the external communications system, the email message for display in the group-based communication system based on the plurality of settings, wherein transmitting the email message comprises transmitting message data that includes a virtual space identifier corresponding to a virtual space at which the email message is to be displayed and a group identifier corresponding to a group of users that are authorized to access the virtual space, wherein the virtual space is inaccessible to users that are absent from the group of users;
    parsing the email message and the message data to identify the virtual space identifier and the group identifier; and
    based at least in part on parsing the email message and the message data to identify the virtual space identifier and the group identifier, causing the email message to be displayed in the virtual space.

2. The method of claim 1, wherein the plurality of settings comprise at least one of a suggested group-based communication system recipient or a suggested group-based communication system destination.

3. The method of claim 2, wherein the suggested group-based communication system destination is determined based in part on user activity within the group-based communication system.

4. The method of claim 2, further comprising:
    causing display of the email message in a direct message associated with the suggested group-based communication system recipient or a channel associated with the suggested group-based communication system destination.

5. The method of claim 1, wherein the plurality of settings further comprises an attachment setting, and further comprising:
    responsive to determining that the email message comprises an attachment, automatically including the attachment with the email message.

6. The method of claim 5, further comprising:
    receiving, from a sending user, an instruction to not include the attachment; and
    responsive to receiving the instruction, removing the attachment from the email message.

7. The method of claim 1, wherein the plurality of settings are configurable by a sending user of the email message.

8. One or more non-transitory computer-readable media storing computer-executable instructions that, when executed by at least one processor, perform a method for transmitting a communication resource between an external communications system to a group-based communication system that is different than the external communications system, comprising:
    causing display of a first sharing user interface element on a first user interface of the external communications system, the first user interface configured to display an email message and the first sharing user interface element being selectable to transmit the email message to the group-based communication system;

responsive to a first selection of the first sharing user interface element, causing display of a visual representation, on the first user interface, for transmitting the email message to the group-based communication system, wherein the visual representation comprises a plurality of settings for configuring display of the email message in the group-based communication system, wherein at least one setting of the plurality of settings is determined based in part on the email message, wherein at least one further setting of the plurality of settings is set to a recommended value based in part on the email message;

transmitting, from the external communications system, the email message for display in the group-based communication system based on the plurality of settings, wherein transmitting the email message comprises transmitting message data that includes a virtual space identifier corresponding to a virtual space at which the email message is to be displayed and a group identifier corresponding to a group of users that are authorized to access the virtual space, wherein the virtual space is inaccessible to users that are absent from the group of users;

parsing the email message and the message data to identify the virtual space identifier and the group identifier; and based at least in part on parsing the email message and the message data to identify the virtual space identifier and the group identifier, causing the email message to be displayed in the virtual space.

9. The one or more non-transitory computer-readable media of claim 8, wherein the plurality of settings comprise at least one of a suggested group-based communication system recipient or a suggested group-based communication system destination.

10. The one or more non-transitory computer-readable media of claim 9, wherein the suggested group-based communication system destination is determined based in part on user activity within the group-based communication system.

11. The one or more non-transitory computer-readable media of claim 9, the method further comprising:
causing display of the email message in a direct message associated with the suggested group-based communication system recipient or a channel associated with the suggested group-based communication system destination.

12. The one or more non-transitory computer-readable media of claim 8, wherein the plurality of settings further comprises an attachment setting, and the method further comprising:
responsive to determining that the email message comprises an attachment, automatically including the attachment with the email message.

13. The one or more non-transitory computer-readable media of claim 12, the method further comprising:
receiving, from a sending user, an instruction to not include the attachment; and
responsive to receiving the instruction, removing the attachment from the email message.

14. The one or more non-transitory computer-readable media of claim 8, wherein the plurality of settings are configurable by a sending user of the email message.

15. A system for transmitting email messages between an external communications system to a group-based communication system that is different than the external communications system, the system comprising:
a data store;
at least one processor; and
one or more non-transitory computer-readable media storing computer-executable instructions that, when executed by the at least one processor, cause the system to carry out actions, comprising:
causing display of a first sharing user interface element on a first user interface of the external communications system, the first user interface configured to display an email message and the first sharing user interface element being selectable to transmit the email message to the group-based communication system;
responsive to a first selection of the first sharing user interface element, causing display of a visual representation, on the first user interface, for transmitting the email message to the group-based communication system,
wherein the visual representation comprises a plurality of settings for configuring display of the email message in the group-based communication system,
wherein at least one setting of the plurality of settings is determined based in part on the email message,
wherein at least one further setting of the plurality of settings is set to a recommended value based in part on the email message;
transmitting, from the external communications system, the email message for display in the group-based communication system based on the plurality of settings, wherein transmitting the email message comprises transmitting message data that includes a virtual space identifier corresponding to a virtual space at which the email message is to be displayed and a group identifier corresponding to a group of users that are authorized to access the virtual space, wherein the virtual space is inaccessible to users that are absent from the group of users;
parsing the email message and the message data to identify the virtual space identifier and the group identifier; and
based at least in part on parsing the email message and the message data to identify the virtual space identifier and the group identifier, causing the email message to be displayed in the virtual space.

16. The system of claim 15, wherein the plurality of settings comprise at least one of a suggested group-based communication system recipient or a suggested group-based communication system destination, wherein the suggested group-based communication system destination is determined based in part on user activity within the group-based communication system.

17. The system of claim 16, the actions further comprising:
causing display of the email message in a direct message associated with the suggested group-based communication system recipient or a channel associated with the suggested group-based communication system destination.

18. The system of claim 15, wherein the plurality of settings further comprises an attachment setting, and the actions further comprising:

responsive to determining that the email message comprises an attachment, automatically including the attachment with the email message.

19. The system of claim 18, the actions further comprising:
receiving, from a sending user, an instruction to not include the attachment; and
responsive to receiving the instruction, removing the attachment from the email message.

20. The system of claim 15, wherein the plurality of settings are configurable by a sending user of the email message.

* * * * *